(12) United States Patent
Tandler et al.

(10) Patent No.: US 10,066,840 B2
(45) Date of Patent: Sep. 4, 2018

(54) SOLAR THERMAL COLLECTOR SYSTEM AND METHOD CONFIGURED FOR RADIANT COOLING

(71) Applicant: MBC Ventures, Inc., Baltimore, MD (US)

(72) Inventors: John Joseph Tandler, Arvada, CO (US); Chris Pearson, Boulder, CO (US)

(*) Notice: Subject to any disclaimer, the term of this patent is extended or adjusted under 35 U.S.C. 154(b) by 674 days.

(21) Appl. No.: 14/598,626

(22) Filed: Jan. 16, 2015

(65) Prior Publication Data
US 2015/0300655 A1    Oct. 22, 2015

Related U.S. Application Data

(60) Provisional application No. 61/928,111, filed on Jan. 16, 2014.

(51) Int. Cl.
*F24D 3/00* (2006.01)
*F24J 2/05* (2006.01)
(Continued)

(52) U.S. Cl.
CPC ............... *F24D 3/005* (2013.01); *F24D 3/14* (2013.01); *F24J 2/05* (2013.01); *F24J 2/201* (2013.01);
(Continued)

(58) Field of Classification Search
CPC ................................... F24D 3/14; F24D 3/005
(Continued)

(56) References Cited

U.S. PATENT DOCUMENTS 3,987,782 A    10/1976  Meier
4,000,850 A *  1/1977   Diggs ..................... F24D 3/005
                                                           126/613
(Continued)

FOREIGN PATENT DOCUMENTS

DE    28 32 304    10/1980
EP    0 016 370    10/1980
(Continued)

OTHER PUBLICATIONS

International Search Report dated Apr. 21, 2015 in co-pending patent application No. PCT/US15/11706.
(Continued)

*Primary Examiner* — Avinash Savani
(74) *Attorney, Agent, or Firm* — Whiteford, Taylor & Preston, LLP; Gregory M. Stone

(57) ABSTRACT

Disclosed herein is a solar thermal collector system that is particularly configured for dual use as a radiant cooling system. In accordance with aspects of a particular embodiment of the invention, the solar thermal collector system includes a solar thermal module having a glazing sheet at a top, exterior surface, and an absorber sheet within the module positioned below and spaced apart from the glazing sheet. The absorber sheet and the glazing sheet are fluidly connected to a fluid handling system, and are configured to carry a working fluid that may be heated in the absorber sheet by the sun to transfer such heat to equipment within the facility in which the system is installed, and to carry the working fluid through the glazing sheet to transfer heat collected from the facility to space. The solar thermal collector module is preferably provided a thermally actuated valve that allows the working fluid to also flow through the glazing sheet, which results in self-regulation of the temperature of the module below a critical design temperature.

23 Claims, 20 Drawing Sheets

(51) Int. Cl.
*F24J 2/24* (2006.01)
*F24J 2/34* (2006.01)
*F24D 3/14* (2006.01)
*F24J 2/52* (2006.01)
*F24J 2/20* (2006.01)
*F24J 2/40* (2006.01)
*F24J 2/42* (2006.01)
*F24J 2/44* (2006.01)
*F24J 2/46* (2006.01)
*F24J 2/50* (2006.01)
*F24J 2/00* (2014.01)

(52) U.S. Cl.
CPC . *F24J 2/24* (2013.01); *F24J 2/34* (2013.01); *F24J 2/402* (2013.01); *F24J 2/42* (2013.01); *F24J 2/44* (2013.01); *F24J 2/4621* (2013.01); *F24J 2/4647* (2013.01); *F24J 2/4649* (2013.01); *F24J 2/506* (2013.01); *F24J 2/5201* (2013.01); *F24J 2002/0046* (2013.01); *F24J 2002/5275* (2013.01); *F24J 2002/5292* (2013.01); *Y02B 10/20* (2013.01)

(58) Field of Classification Search
USPC .......................................... 126/634, 629, 623
See application file for complete search history.

(56) References Cited

U.S. PATENT DOCUMENTS

| | | | |
|---|---|---|---|
| 4,038,970 A | 8/1977 | D'Ascoli et al. | |
| 4,043,317 A * | 8/1977 | Scharfman | F24J 2/0477 126/596 |
| 4,088,117 A | 5/1978 | Keyes | |
| 4,114,599 A | 9/1978 | Stephens | |
| 4,191,169 A | 3/1980 | Hyman | |
| 4,201,195 A | 5/1980 | Sakhuja | |
| 4,206,748 A | 6/1980 | Goodman et al. | |
| 4,223,663 A * | 9/1980 | Carmichael | F24J 2/0433 126/400 |
| 4,252,103 A | 2/1981 | Carter et al. | |
| 4,287,882 A | 9/1981 | Mattson | |
| 4,321,912 A | 3/1982 | Larsen | |
| 4,339,930 A | 7/1982 | Kirts | |
| 4,346,693 A * | 8/1982 | Wagner | F24D 11/007 126/638 |
| 4,399,807 A | 8/1983 | Buckley et al. | |
| 4,426,999 A | 1/1984 | Evans et al. | |
| 4,517,721 A * | 5/1985 | Graham | F24J 2/26 126/651 |
| 4,712,338 A | 12/1987 | Trickel | |
| 5,246,350 A | 9/1993 | Lackstrom et al. | |
| 5,404,867 A * | 4/1995 | Rich | F24J 2/4627 126/570 |
| 5,799,723 A * | 9/1998 | Sokolean | F24D 3/165 165/168 |
| 6,363,928 B1 | 4/2002 | Anderson | |
| 7,487,771 B1 | 2/2009 | Eiffert et al. | |
| 7,661,422 B2 * | 2/2010 | Liu | F24J 2/202 126/629 |
| 7,753,048 B2 | 7/2010 | Liu et al. | |
| 8,307,606 B1 | 11/2012 | Rego et al. | |
| 8,640,423 B2 | 2/2014 | Meppelink et al. | |
| 8,844,226 B2 * | 9/2014 | Harkins | E04B 7/024 126/621 |
| 8,881,472 B2 | 11/2014 | Knapp | |
| 2005/0217665 A1 | 10/2005 | Luconi | |
| 2007/0039609 A1 * | 2/2007 | Huebner | E04C 2/525 126/570 |
| 2007/0151559 A1 * | 7/2007 | Lencastre Godinho | F24D 11/003 126/617 |
| 2007/0272234 A1 | 11/2007 | Allen et al. | |
| 2009/0095281 A1 | 4/2009 | Barnes et al. | |
| 2010/0132697 A1 | 6/2010 | Mueller | |
| 2010/0186733 A1 | 7/2010 | Hoefler | |
| 2011/0146939 A1 | 6/2011 | Bond et al. | |
| 2011/0203572 A1 | 8/2011 | Jackman | |
| 2011/0203573 A1 | 8/2011 | Hollis et al. | |
| 2012/0085093 A1 | 4/2012 | Kim | |
| 2012/0227926 A1 | 9/2012 | Field et al. | |
| 2013/0192587 A1 | 8/2013 | Lewenz et al. | |
| 2014/0041651 A1 | 2/2014 | Mireshghi | |
| 2014/0299178 A1 | 10/2014 | Devlin et al. | |

FOREIGN PATENT DOCUMENTS

| | | |
|---|---|---|
| EP | 2 182 302 | 5/2010 |
| KR | 101 032 022 | 5/2011 |
| WO | 03/085329 | 10/2003 |
| WO | 2006/035455 | 4/2006 |

OTHER PUBLICATIONS

International Search Report dated Jul. 24, 2015 in co-pending patent application No. PCT/US15/11710.

* cited by examiner

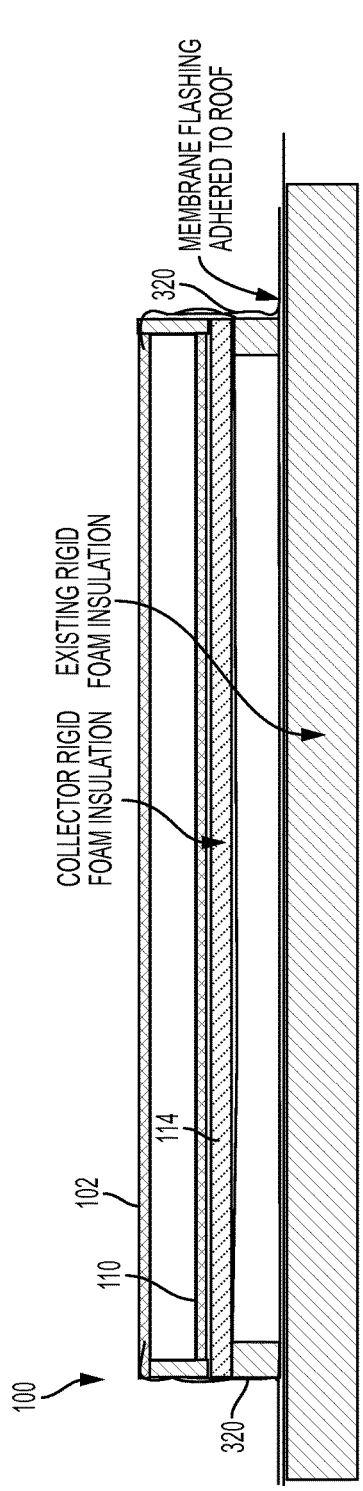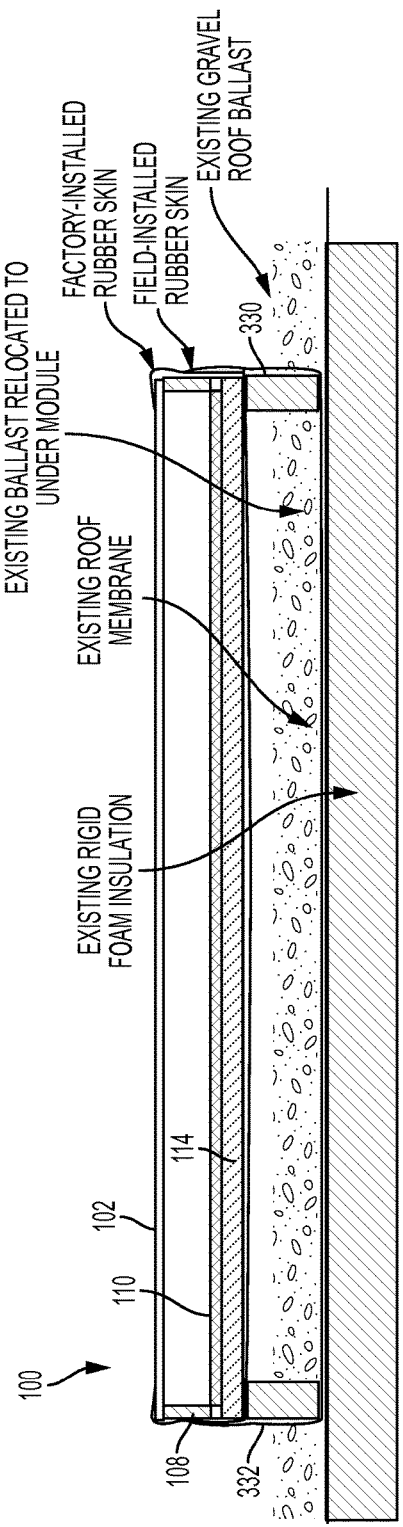

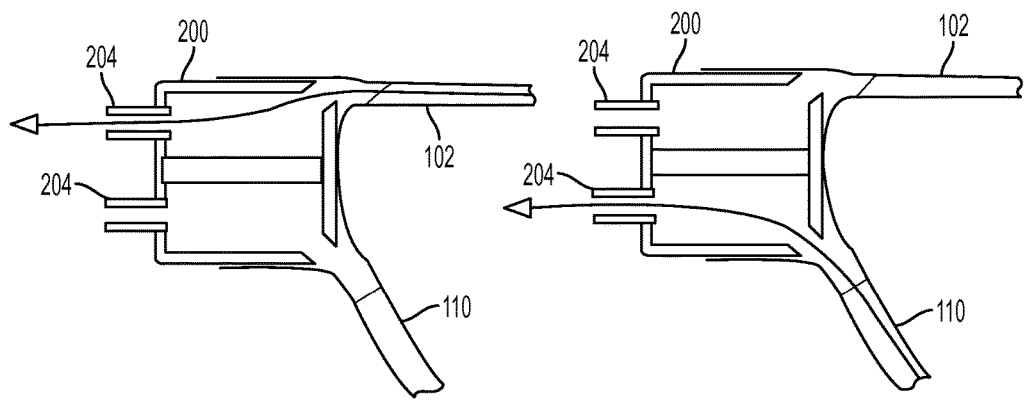
FIG. 11A    FIG. 11B
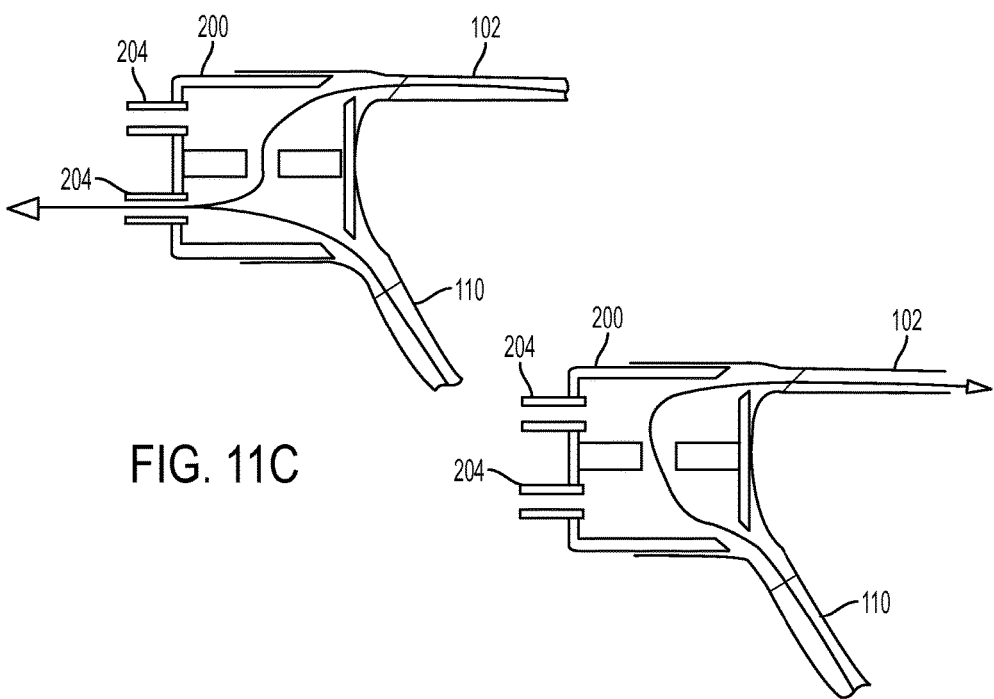
FIG. 11C
FIG. 11D

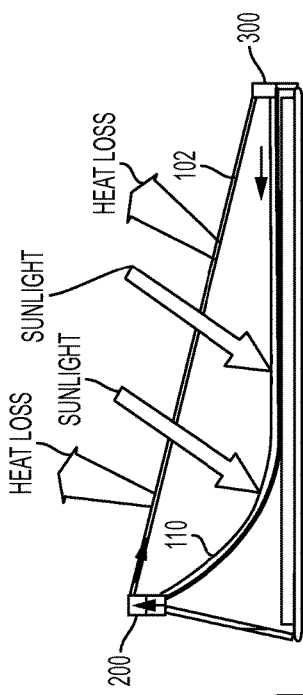
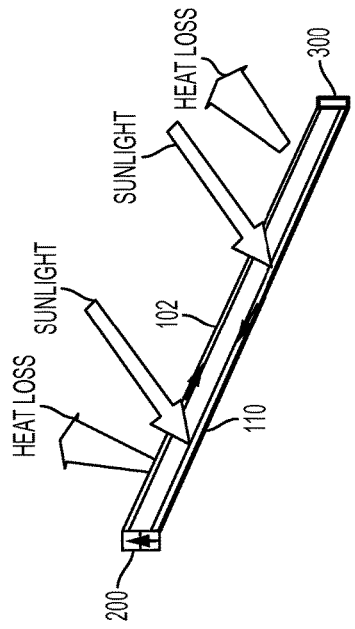
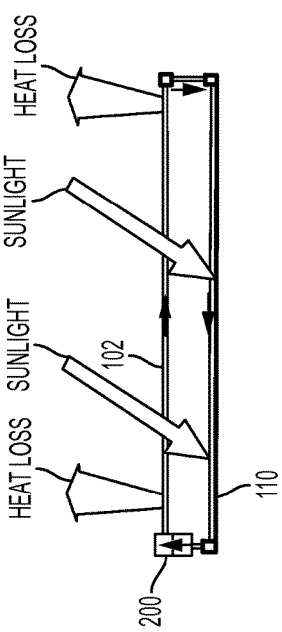
FIG. 12A
FIG. 12B
FIG. 12C
FIG. 12D

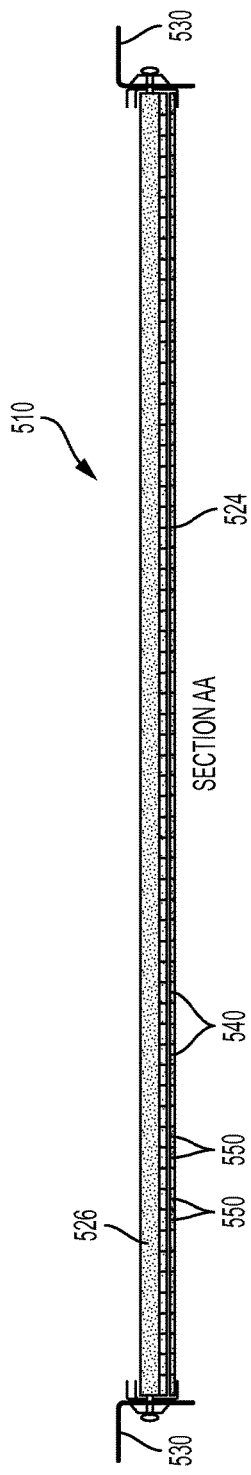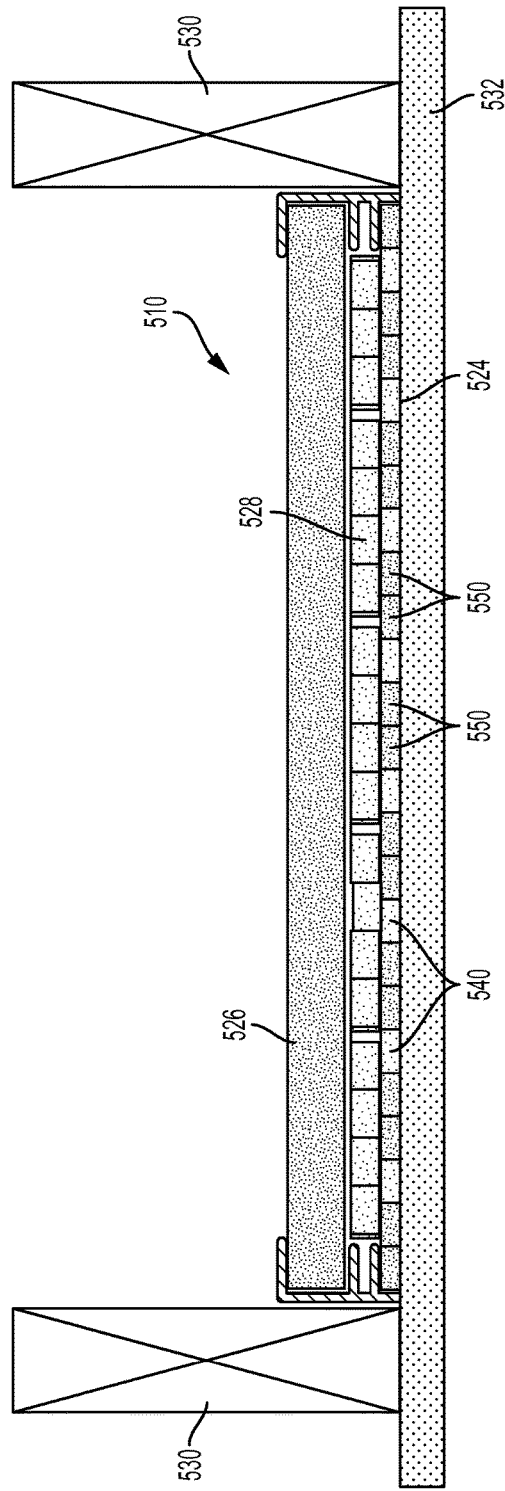

SOLAR THERMAL COLLECTOR SYSTEM AND METHOD CONFIGURED FOR RADIANT COOLING

CROSS REFERENCE TO RELATED APPLICATION

This application is based upon and claims benefit of U.S. Provisional Patent Application Ser. No. 61/928,111 entitled "Systems and Methods for Solar Heating and Cooling of Buildings," filed with the U.S. Patent and Trademark Office on Jan. 16, 2014 by the inventor herein, the specification of which is incorporated herein by reference in its entirety.

FIELD OF THE INVENTION

This invention relates to radiant energy management, and more particularly to a solar thermal collector system configured for dual use as a radiant cooling system.

BACKGROUND OF THE INVENTION

Skylight systems have previously been provided that are capable of providing the majority of the lighting needs for various flat roof commercial buildings. In such systems, the skylight may convert the excess solar energy that is not needed for illumination into thermal energy that can be used for process hot water, space heating, and solar cooling. Solar cooling apparatus, such as absorption chillers and liquid desiccant dehumidifiers, typically require between 1.3 and 1.7 units of thermal energy to provide one unit of cooling to the building. An economically designed energy managing skylight system may employ skylights that cover only about 5 to 6% of the roof area. Even at relatively high thermal efficiencies, this only provides about one fourth of the thermal energy needed to cool the entire building area below the skylights.

In order to serve the entire building, and to make the best use of the roof as an energy resource, it is preferable to provide supplemental thermal energy in addition to what is generated by such energy managing skylights. It is possible to supplement the thermal energy using conventional solar thermal collectors. However, the cost of installation per unit of thermal energy generated by conventional thermal collectors is much higher than that generated by previously presented energy managing skylights, and the overall project economics can be significantly degraded. Another option is to use a fossil fuel such as natural gas as the supplemental heat source. This has the advantage of providing firm capacity during periods of low sunlight, but the expense of the gas backup degrades the project economics and the additional fossil fuel use works against one of the main product objectives of being a primary renewable energy source. Thus, there is an ongoing need for a lower-cost method of generating thermal energy at a sufficient temperature to drive solar cooling equipment that is optimized for the commercial rooftop and seasonal summer operation.

Moreover, the majority of solar panels on the market today are designed to optimize efficiency for a given amount of solar radiation flux and outside air temperature. The drive for higher efficiency results in the use of relatively expensive materials such as copper, aluminum, and glass, as well as optical treatments such as low emissivity absorber coatings and low reflective coatings for cover glass. The higher the thermal collection efficiency for the panel, the higher will be the stagnation temperature which occurs when the module is in full sunlight but there is no liquid flow to pull the heat away. Stagnation temperatures between 350 and 400° F. are not uncommon for good quality collectors. These high stagnation temperatures then drive the need for even more expensive materials and components to ensure that the panel does not damage itself in full sunlight.

In summary, there are many other design considerations in addition to a high heat collection efficiency per unit area when providing heat to support year-round space conditioning on a flat roof commercial building.

Virtually all existing solutions make use of some form of fin and tube configuration. That is, solar energy is collected on a flat surface normal to the sun's rays, and the heat is conducted along the surface to a tube through which a working fluid flows. As the heat is conducted along the relatively thin absorber surface, there is a significant temperature drop between the absorbing surface and the working fluid. This temperature drop results in thermal losses of between 12 and 18 percent, because the higher temperature of the absorber surface compared to the fluid temperature results in higher losses to the environment. In addition, an efficient fin design requires creating a good thermal bond between the flat sheet and the fluid tube, which is a significant design challenge that drives up costs and creates failure points. The tubes can be clamped, brazed, soldered, or attached with thermal grease, all of which require substantial manufacturing resources. A solar collector configuration which eliminates heat flow transverse to the sun's rays will effectively have a fin efficiency of 1.0, with a significant overall performance improvement, and have none of the assembly issues.

Further, nearly all current designs place the absorber surfaces directly under the glazing. This causes a direct convective and radiative coupling between the two surfaces, accounting for the majority of the heat loss from the collector. The glazing is typically made of low-iron glass, which has a high light transmissivity of about 90% but which is heavy, is a very poor insulator and so does not maintain more than a few degrees temperature difference across it. Since the emissivity of the glass is high (0.9 or so), in order to limit the radiative heat loss, it is necessary for the absorber to have a low emissivity, along with a high absorptivity. This can be achieved using very thin black coatings such as black chrome, but applying such coatings requires specialized techniques such as vacuum deposition. In addition, many such coatings make use of toxic materials that require special handling, all adding considerable expense to the finished product. A collector design in which the absorber surface is somewhat insulated from the glazing, which uses a glazing with more insulating properties, and which can use simpler absorbing materials such as ordinary black paint, would be of lower cost, of higher efficiency, and more environmentally friendly.

Other solutions to reduce collector cost have recently become available that make use of lower cost materials than the classic flat plate or evacuated tube designs. The most common is the unglazed black plastic "pool heater" solar collector. In this collector design, solar radiation is absorbed directly by the black plastic tubes through which the coolant flows. Because there is a low insulation level between the coolant and the environment, this collector design is typically used for low temperature applications in warm climates such as heating water for swimming pools. There are several fundamental limitations which have thus far prevented the deployment of high efficiency, low cost, polymer (i.e., plastic) collectors.

The first problem is the low melting point of plastics that are sufficiently low in cost to be considered for use as collectors. Adding a glazing layer of glass or plastic material over the collector surface is of course the simplest way to increase the efficiency. However, even one glazing layer over a black plastic collector surface can allow the stagnation temperature to quickly exceed the softening point of the plastic.

Secondly, extruded panels with discrete flow channels must be connected to a header or manifold. A waterproof seal must be made between the irregular shape of the cross section of the end of the extrusion and the fluid carrying tube that forms the manifold. The seal is typically made by making the manifold of the same material as the extruded panel and welding the two materials together. The irregular shape of this welded joint makes the joint difficult to fabricate and prone to leakage with thermal cycles.

Further, all plastics have very low strength and stiffness relative to metals. This makes it difficult for plastic solar panels to contain typical aqueous heat transfer fluid that in ordinary solar thermal systems can reach pressures of 150 PSI. The fluid pressure requirements in ordinary solar thermal systems are driven in large part by the use of water-based coolants such as water glycol mixtures which can boil or create vapor bubbles that can rapidly increase the pressure in the fluid passages. A solar collector that makes use of low-cost and lightweight plastic materials, but that overcomes the issues of the low service temperatures and pressure containment, would have the advantages of low cost and weight without the disadvantages of current plastic collector designs.

Further, solar thermal collector systems for use on pitched roof constructions, such as many residential constructions, which may by way of non-limiting example form a part of a solar hot water system for a residential application, can carry their own unique challenges and design requirements. Typical residential solar thermal systems use a temperature sensor, a controller and a 120V mechanical pump, which not only drive material costs, but also constitute a significant portion of the installation costs since more highly skilled installers are required to run wiring and connect sensors. Usually, permits and inspections are required with such electrical installations, which further drives costs. In order to radically lower the cost of residential solar thermal systems, the system must use lighter and lower-cost raw materials to eliminate expensive components such as pumps, sensors, and controls, and be capable of being installed by relatively low-skilled labor.

One solution to simplify residential solar hot water systems is to use thermosiphoning instead of pumped flow. The biggest factor limiting the widespread adoption of thermosiphon residential solar hot water systems is the fact that the addition of glycol to the water increases the viscosity to the point that there is not adequate thermosiphon potential to overcome the additional pressure drop. Therefore, thermosiphon residential solar hot water systems have only been found practical in very warm climates where freezing conditions are never encountered, such as subtropical and tropical regions. In the US, only southern Florida and southern California are candidates for such systems. A thermosiphon-based system which can operate in all climates including very cold climates would have tremendous advantages.

Another factor in the design of a solar collector for both flat roof, generally commercial buildings and for pitched roof, generally residential buildings is the potential use of the solar collector as a cooling device. In climates with high solar radiation during the day and relatively low humidity at night, a significant amount of building cooling can be achieved by using night sky radiant cooling techniques. One problem with night sky radiant cooling is that the typical cooling heat fluxes are only about 1/10 those which can be achieved during solar collection of sunlight. That is, the night sky radiant cooler rejecting heat at 80° F. into a clear night sky can radiate only a maximum of about 80 W per square meter, compared with maximum heat collection rates of 700 or 800 W per square meter in full sunlight. Also, the cooling effect is generally uncorrelated in time with the cooling loads. Therefore, for a night sky radiant cooling method to be cost-effective, it must either be of extremely low cost or must piggyback to provide a cooling function on top of an existing heat collection function, plus it ideally would have low cost thermal storage as well. Several techniques have been described for night sky radiant cooling, such as flushing the roof surface with water at night, and using relatively low efficiency solar collectors as radiators at night, but these techniques are not practical as yet. The fundamental problem with using solar collectors as radiant cooling devices is that the design of the collector is intended to thermally isolate the fluid from the ambient air and the radiant sky environment. A solar collector with two separate fluid paths that could do double duty as an efficient night sky radiant cooling device could make a significant contribution to cooling flat roof commercial buildings in sunny dry climates.

Thus, there remains a need in the art for a cost effective and efficient solar thermal collector system that may also serve as an efficient night sky radiant cooling device that will avoid the foregoing disadvantages of prior art solar thermal collector systems.

SUMMARY OF THE INVENTION

Disclosed herein is a solar thermal collector system that is particularly configured for dual use as a radiant cooling system. In accordance with aspects of a particular embodiment of the invention, the solar thermal collector system includes a solar thermal module having a glazing sheet at a top, exterior surface, and an absorber sheet within the module positioned below and spaced apart from the glazing sheet. The absorber sheet and the glazing sheet are fluidly connected to a fluid handling system, and are configured to carry a working fluid that may be heated in the absorber sheet by the sun to transfer such heat to equipment within the facility in which the system is installed, and to carry the working fluid through the glazing sheet to transfer heat collected from the facility to space. The solar thermal collector module is preferably provided a thermally actuated valve that allows the working fluid to also flow through the glazing sheet, which results in self-regulation of the temperature of the module below a critical design temperature.

In accordance with a particularly preferred embodiment of the invention, a solar thermal system is provided that is operable as a solar thermal collection system and a radiant cooling system, comprising at least one solar thermal module comprising a glazing sheet forming a top surface of the module, an absorber sheet on an interior of the module and positioned below and spaced apart from the glazing sheet, the absorber sheet being configured to absorb heat from the sun and to transfer heat to a working fluid in the absorber sheet, a first manifold connected to a first end of each of the glazing sheet and the absorber sheet, and a second manifold connected to a second end of each of the glazing sheet and the absorber sheet, and a thermal actuating valve positioned within the second manifold, in which the solar thermal module defines a first working fluid flow path from the first manifold, through said absorber sheet, and out of the second manifold when the module is operated in a thermal collection operational mode, and defines a second working fluid flow path from the first manifold, through the glazing sheet, and out of the second manifold when the module is operated in a radiant cooling operational mode.

BRIEF DESCRIPTION OF THE DRAWINGS

The numerous advantages of the present invention may be better understood by those skilled in the art by reference to the accompanying drawings in which:

FIG. 7 is an end cross-sectional view of the solar thermal module of FIG. 2 installed on a flat roof.

FIG. 8 is an end cross-sectional view of the solar thermal module of FIG. 2 installed on a flat roof.

FIG. 11A is a detailed schematic view of fluid flow through an upper manifold of the solar thermal module of FIG. 2 in a first operational mode.

FIG. 11B is a detailed schematic view of fluid flow through the upper manifold of FIG. 11A in a second operational mode.

FIG. 11C is a detailed schematic view of fluid flow through the upper manifold of FIG. 11A in a third operational mode.

FIG. 11D is a detailed schematic view of fluid flow through the upper manifold of FIG. 11A in a fourth operational mode.

FIG. 12A is a schematic view of temperature self-regulation fluid flow through the solar thermal module of FIG. 2 under pumped flow conditions.

FIG. 12B is a schematic view of temperature self-regulation fluid flow through the solar thermal module of FIG. 2 in the absence of pumped flow.

FIG. 12C is a schematic view of temperature self-regulation fluid flow through the solar thermal module of FIG. 2 in a horizontal box configuration.

FIG. 12D is a schematic view of temperature self-regulation fluid flow through the solar thermal module of FIG. 2 in a tilted module configuration.

FIG. 26 is a close-up view of another radiating panel for use with the system of FIG. 23.

FIG. 27 is a close-up view of another radiating panel for use with the system of FIG. 23 when installed on pitched roof construction.

DETAILED DESCRIPTION OF THE PREFERRED EMBODIMENTS

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
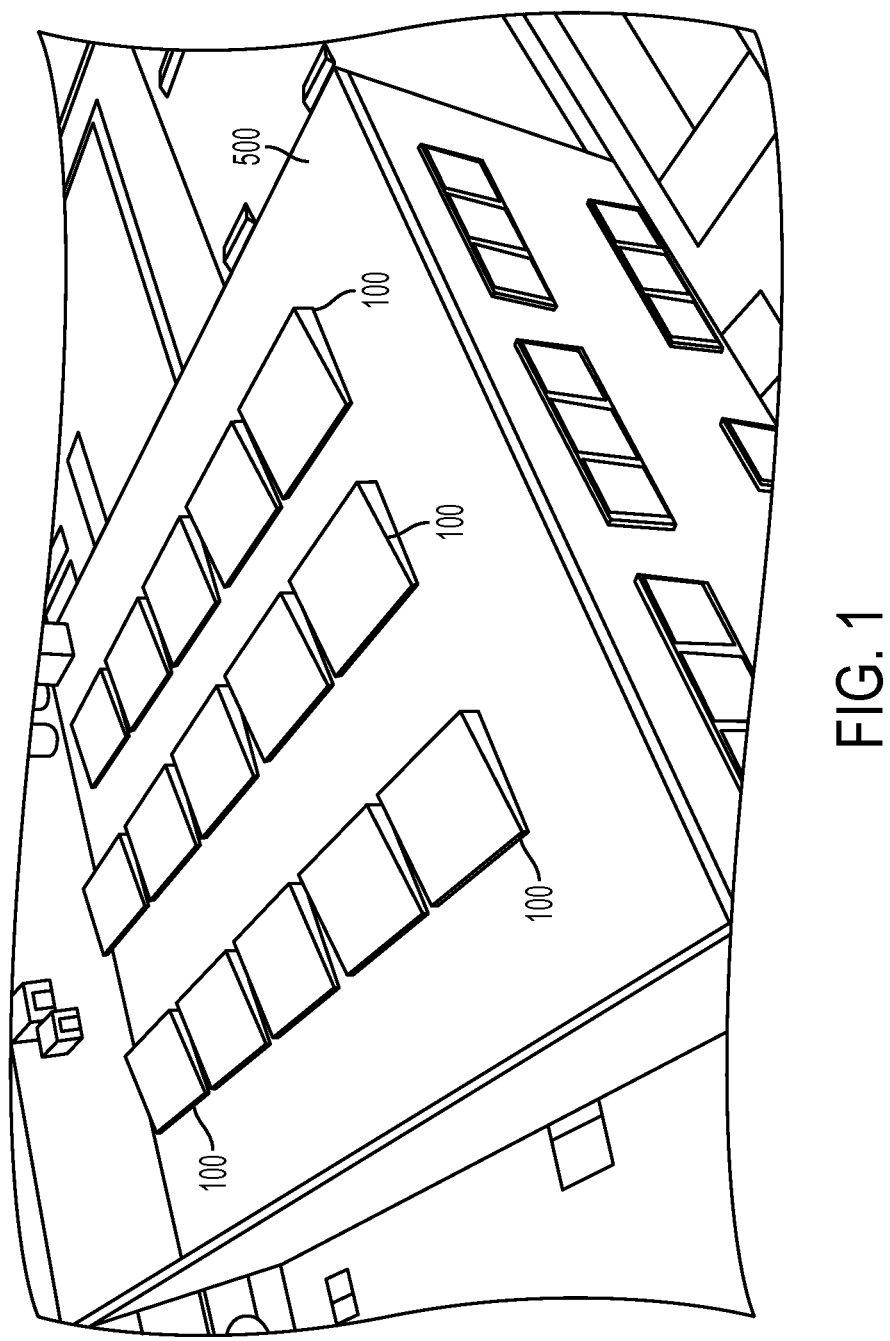
FIG. 1 is a perspective view of a building implementing a solar thermal collector system in accordance with certain aspects of an embodiment of the invention.

In accordance with certain aspects of an embodiment of the invention, an improved solar thermal collection system is provided, including one or more solar thermal collection units 100 which may be situated, for instance, on the flat roof 500 of a commercial building, as shown in FIG. 1. The improved solar thermal collection system achieves much lower cost than prior known systems with good performance in the summer season by making use of very low cost, low profile solar thermal collection units 100 that leverage the insulating and structural features of the commercial flat roof 500 itself.

Figure 2:
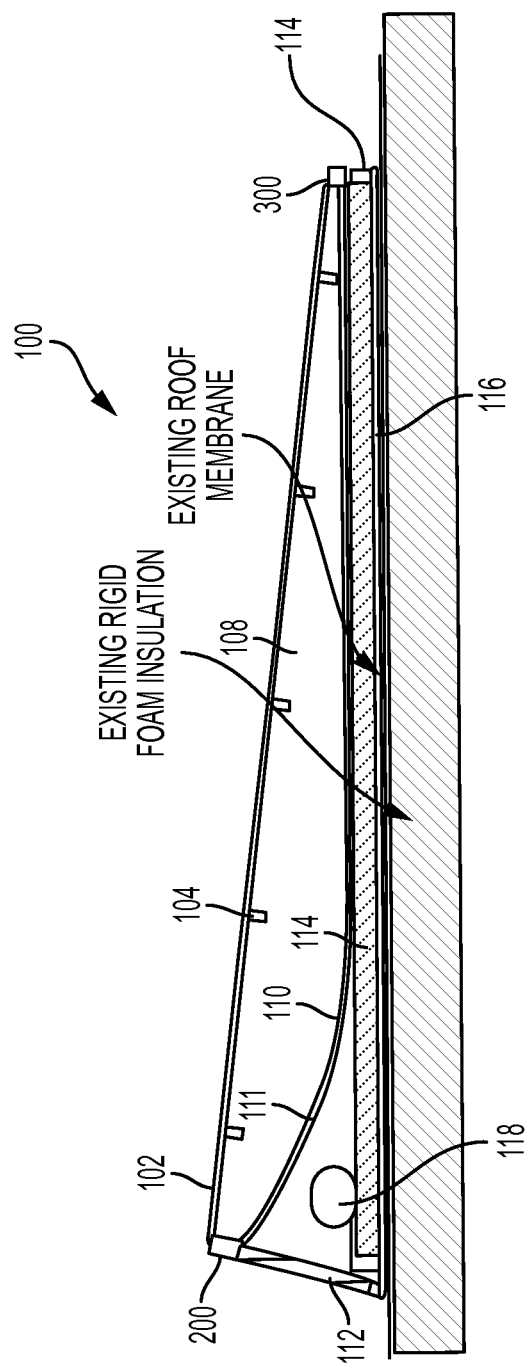
FIG. 2 is a side cross-sectional view of a solar thermal module for use with the system of FIG. 1.

FIG. 2 provides a side, cross-sectional view of one of thermal collection units 100. Thermal collection unit 100 includes a top glazing sheet 102 forming a top layer made of thin (4 to 6 mm) twin wall or triple wall polycarbonate sheet, supported by a lattice of aluminum rectangular tubing 104 (best viewed in FIG. 3), although other lightweight support structures and configurations may be provided. The glazing sheet 102 and its supporting lattice 104 are preferably configured to support compressive environmental loads as high as 50 lbs/ft$^2$, and transfer those loads to the perimeter support.

Figure 3:
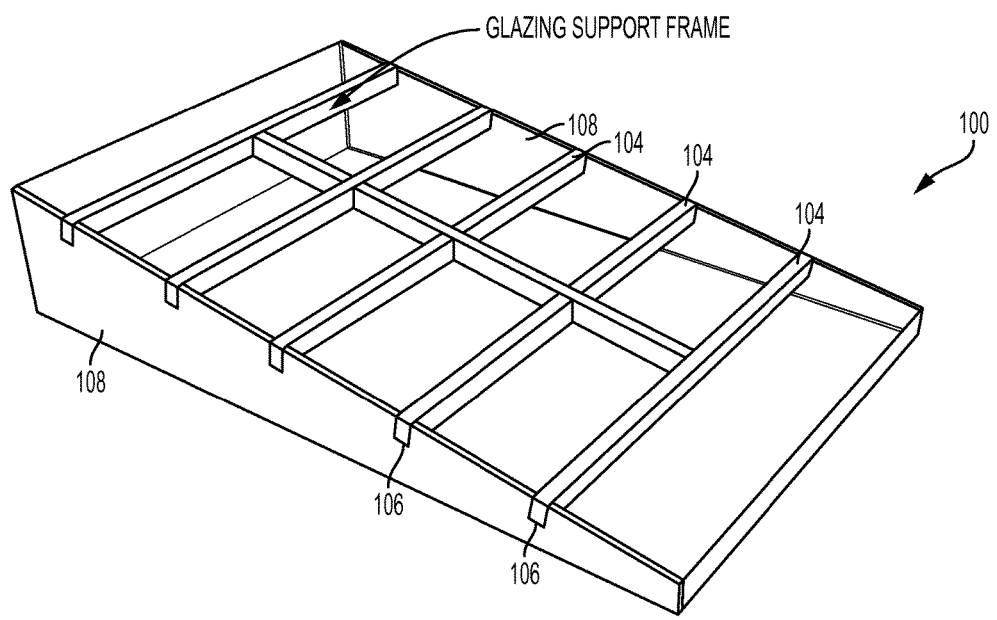
FIG. 3 is a perspective view of the solar thermal module of FIG. 2 with certain elements removed for clarity.

As best viewed in FIG. 3 (showing thermal collection unit 100 without glazing sheet 102 for clarity), the support frame is supported on the sides by notches 106 cut in the thick, multi-wall polycarbonate sheet side support walls 108.

Referring again to FIG. 2, below the glazing sheet 102 is an absorber sheet 110 (also removed from FIG. 3 for clarity), which absorber sheet 110 is also made of thin, twin wall polycarbonate. Absorber sheet 110 is painted black on the back side 111, preferably using ordinary black paint. The glazing sheet 102 and the absorber sheet 110 are connected at each end by a manifold (200 and 300), which in each case comprises a preferably square polycarbonate tube joined to each of the splayed faces of the glazing sheet 102 and the absorber sheet 110, such as by thermowelding, to form a transverse fluid passage that is hydraulically connected to the passages in each of glazing sheet 102 and absorber sheet 110, as discussed in greater detail below. As shown in the sectional view of FIG. 4, the glazing sheet 102 and the vertical side walls 108, along with back wall 112 and front wall 114 of thermal collection unit 100, may all be sealed along all of the edges using thin sheets of polycarbonate material 109 that are joined to the outside faces, such as by way of solvent welding. The solvent welding provides a strong, weather-tight bond almost instantly and at low cost. Together the bonds form a watertight enclosure that prevents air and water intrusion into the central module cavity. The frame 104 is supported by notches 106 in the side walls 108 so that the frame is completely enclosed in the airtight cavity.

As shown in FIG. 2, the thermal absorber surface is inverted from the conventional orientation by being located on the bottom of the transparent fluid carrying channels of absorber sheet 110. Putting the absorbing surface below the fluid passage may provide one or more of the following advantages. First, it is not necessary for the absorbing material to have a low degree of reflectivity, since the degree of solar absorption is a function of the opacity of the material and not the absorptivity. Opaque coatings are much easier to manufacture and apply than high absorptivity/low emissivity coatings. Second, having the absorbing surface facing downward puts the highest temperature portion of the collector in a location that is more insulated and decoupled from the glazing and the environment. The top surface of the absorber is significantly cooler than the black absorber surface, such that it radiates and convects less energy to the glazing.

Figure 5:
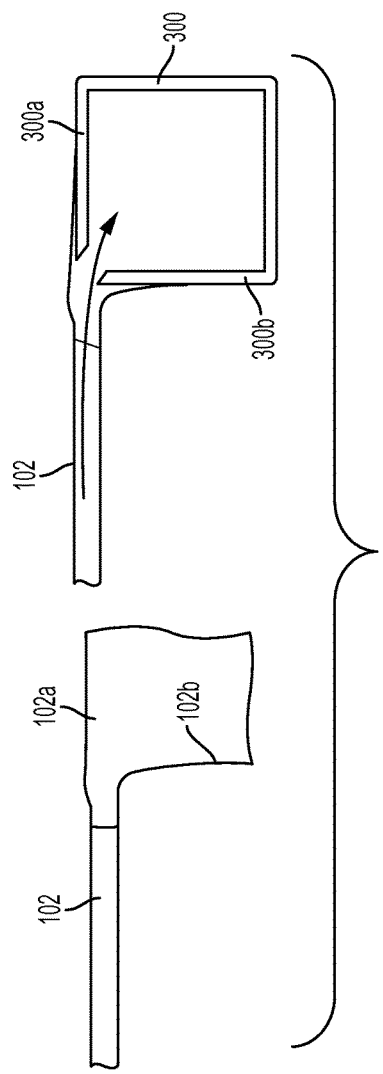
FIG. 5 is a schematic view showing the attachment of a glazing sheet or absorber sheet to a manifold for use with the solar thermal module of FIG. 2.
Figure 6:
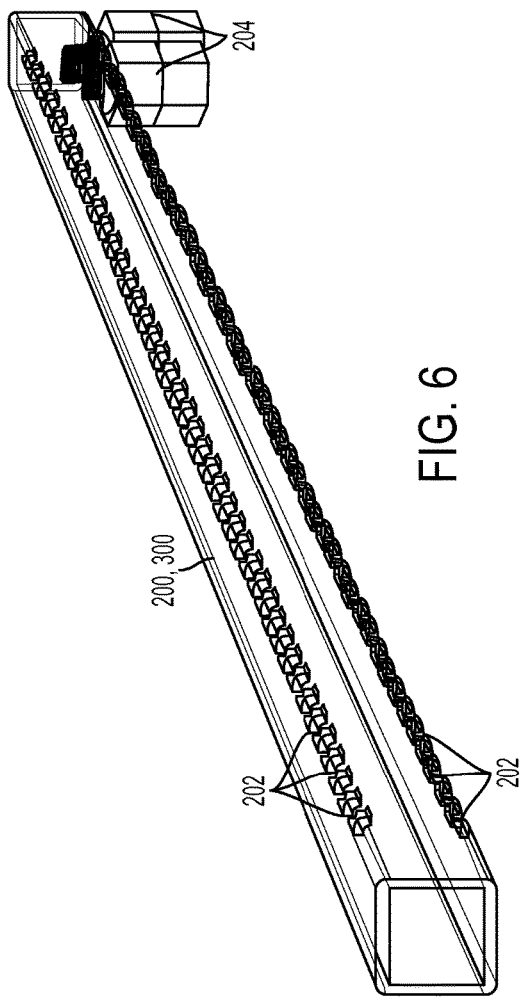
FIG. 6 is a perspective view of a manifold for use with the solar thermal module of FIG. 2.

As mentioned briefly above, each manifold 200 and 300 is joined to each of glazing sheet 102 and absorber sheet 110. As shown in FIG. 5, and using top glazing sheet 102 as an example (although lower absorber sheet 110 is joined to manifolds 200 and 300 in like fashion), top glazing sheet 102 comprises a multi-wall polycarbonate sheet. A top face 102a and a bottom face 102b of the sheet 102 are separated from one another at the end of the sheet 102 that is to be joined to a manifold 200 or 300 (such as by cutting across the middle of sheet 102 at the end of the sheet so that about one inch of the face sheet on each side is cut away from the transverse cell walls that connect the face sheets to each other), and any inner cells within the region of sheet 102 that are between the splayed apart top face 102a and bottom face 102b are cut away from sheet 102. The bottom face 102b of sheet 102 is bent downward to align with a side wall 300b of manifold 300. As shown in FIG. 6, along at least one and in some cases two corner edges of each manifold 200 and 300, slots 202 are provided that perforate the corner edges of the manifold 200 and 300, which allows fluid to enter each manifold 200 and 300 from the absorber sheet 110, and in certain configurations the glazing sheet 102. The splayed face sheets of each twin wall sheet (top face 102a and bottom face 102b in FIG. 5) are attached to the flat faces of manifolds 200 and 300 preferably using plastic joining techniques, such as solvent welding, thermowelding, or bonding.

Connected to each manifold 200 and 300 are fluid fittings 204 that allow a working fluid to enter at the bottom end of the module (which in typical installations will be the south end of the module), flow directly through the narrow space within at least absorber sheet 110 and in certain configurations glazing sheet 102, and exit via the upper manifold (which in typical installations will be the north end of the module), as discussed in greater detail below.

The north and south manifolds, 200 and 300, respectively, and the frame lattice 104, are supported around the perimeter by walls 108, which are also formed of multi-wall polycarbonate. However, these side walls 108 are much thicker (16 mm to 25 mm thick) to transfer the compressive loads to the bottom layer and provide thermal insulation to the air cavity below the glazing. Present in the design, but not shown in the cross-section are triangular-shaped walls that seal the east and west sides of the module 100 and support the glazing along the sides. The back, north wall 112 has the highest profile above the roof and thus is susceptible to the highest wind loading. Sloping the back, north wall 112 slightly (as shown in FIG. 2) has the effect of reducing the horizontal component of the wind loading on that wall, as well as adding a vertical component of the wind which tends to hold the panel down.

Figure 4:
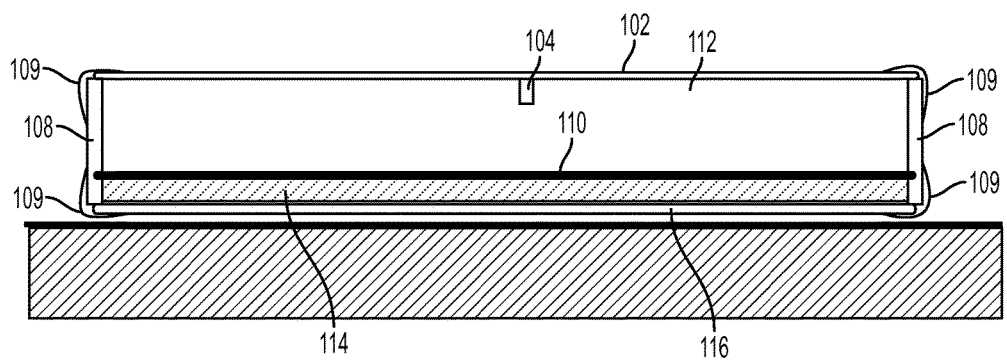
FIG. 4 is an end cross-sectional view of the solar thermal module of FIG. 2.

With continued reference to FIGS. 2 and 4, below the absorber sheet 110 is a board of rigid insulation 114, such as polyisocyanurate, which preferably has a foil face on the top to reduce radiation coupling with the absorber sheet 110. The bottom layer 116 of the module 100 is a third twin wall polycarbonate sheet that is sealed at the ends so that it forms multiple vessels, each of which is capable of holding liquid ballast, which makes it less susceptible to leaks. A small amount of super absorbent polymer, such as sodium polyacrylate, can be placed in the ballast sheet before sealing so that when water is added to the volume, it forms a dense gel or solid (depending on the amount of polymer added) so that if the vessel integrity is broken, the water will not leak out. This fluid volume is connected to an additional ballast tank 118 (FIG. 2) which has a fill port extending outside of the module. The ballast tank 118 is preferably shipped dry to minimize transportation weight and ease of handling on the roof. Once the module 100 has been located in the desired location on the roof, the ballast tanks 118 are filled with water from a hose at the installation site. Most of the ballast is spread evenly across the module 100 in the bottom layer sheet 116, while some additional ballast fluid is in the tank 118 near the north wall where most of the horizontal wind loads occur. In order to reduce the stress on the bottom layer sheet 116 from freezing and thawing of the water ballast, the ballast vessel could be preloaded with a few gallons of glycerine, an antifreeze that is compatible with polycarbonate. When mixed, the solution would freeze into a slush which would not burst the walls of the bottom layer sheet 116.

Optionally, module 100 may be provided without bottom layer sheet 116 configured to receive water for ballast. For example, as shown in FIG. 7, in installations in which the roof membrane is adhered to the underlying insulation, a flashing 320 may be installed around the perimeter of the module 100 by adhering it to the base of the polycarbonate walls 108. This flashing 320 would be made of the same material as the roof itself, and thus can be attached directly to the roof membrane using the same sealing adhesive materials used to join membrane roof seams. This would eliminate the need for ballast and reduce the total installed weight of module 100.

Similarly, and with reference to FIG. 8, in installations incorporating a ballasted roof design, the roof membrane is not attached to the insulation, but is held in place by about 10 lbs/ft² of gravel ballast which holds the membrane down. In this case, the module 100 may be mounted on a wooden 2×4 frame 330 around the perimeter, and a rubber membrane 332 is placed under the existing gravel ballast. The rubber membrane 332 is bonded to the outside of the polycarbonate walls 108 of the module 100 to enclose a cavity under the module 100 containing the ballast. This has the advantage of requiring no additional materials for ballasting, and maintaining the same total ballast in weight per unit area. In addition, if a portion of the existing ballast equal to the weight of the module 100 is removed upon installation, it is possible for the module 100 to have zero net weight impact on the roof.

Figure 9:
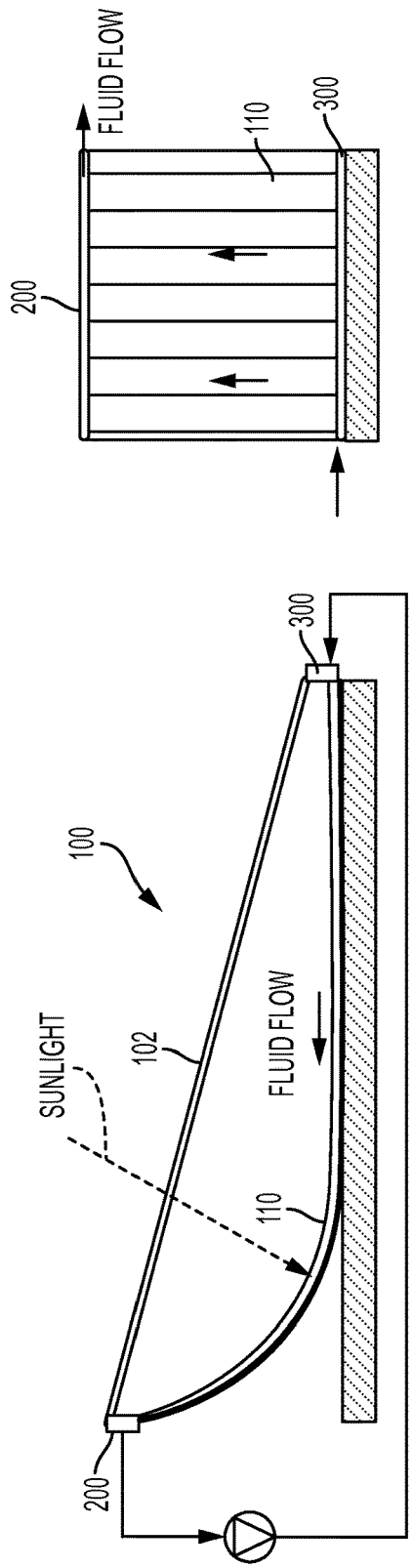
FIG. 9 is a schematic view of the flow of a working fluid through the solar thermal module of FIG. 2.

FIG. 9 shows a schematic flow diagram of a working fluid as it travels through the module 100 from lower south manifold 300 to upper north manifold 200 along and through absorber sheet 110. The working fluid enters lower south manifold 300, passes into absorber sheet 110 where it absorbs heat from sunlight impacting the thermal absorber surface on the back 111 of absorber sheet 110, and rises in elevation up to upper north manifold 200, from which it exists into a flow system as discussed in greater detail below. It is noted that the fluid entrance into lower south manifold 300 is positioned at an opposite end of the manifold 200 from an outlet on upper north manifold 200 so as to ensure constant and uniform flow of working fluid through module 100.

In operation, the sun's rays pass through top glazing sheet 102 and through absorber sheet 110 itself (and the fluid in the absorber sheet), and strike the black paint on the back surface 111 of absorber sheet 110. This heats up the lower half of the absorber sheet 110. A working fluid is circulated directly through the twin wall absorber sheet 110 from the lower south manifold 300 to the upper north manifold 200, which working fluid picks up the heat and causes it to rise in temperature as it flows. The fluid exits the upper north manifold 200 at a higher temperature, thus collecting solar heat.

Figure 10:
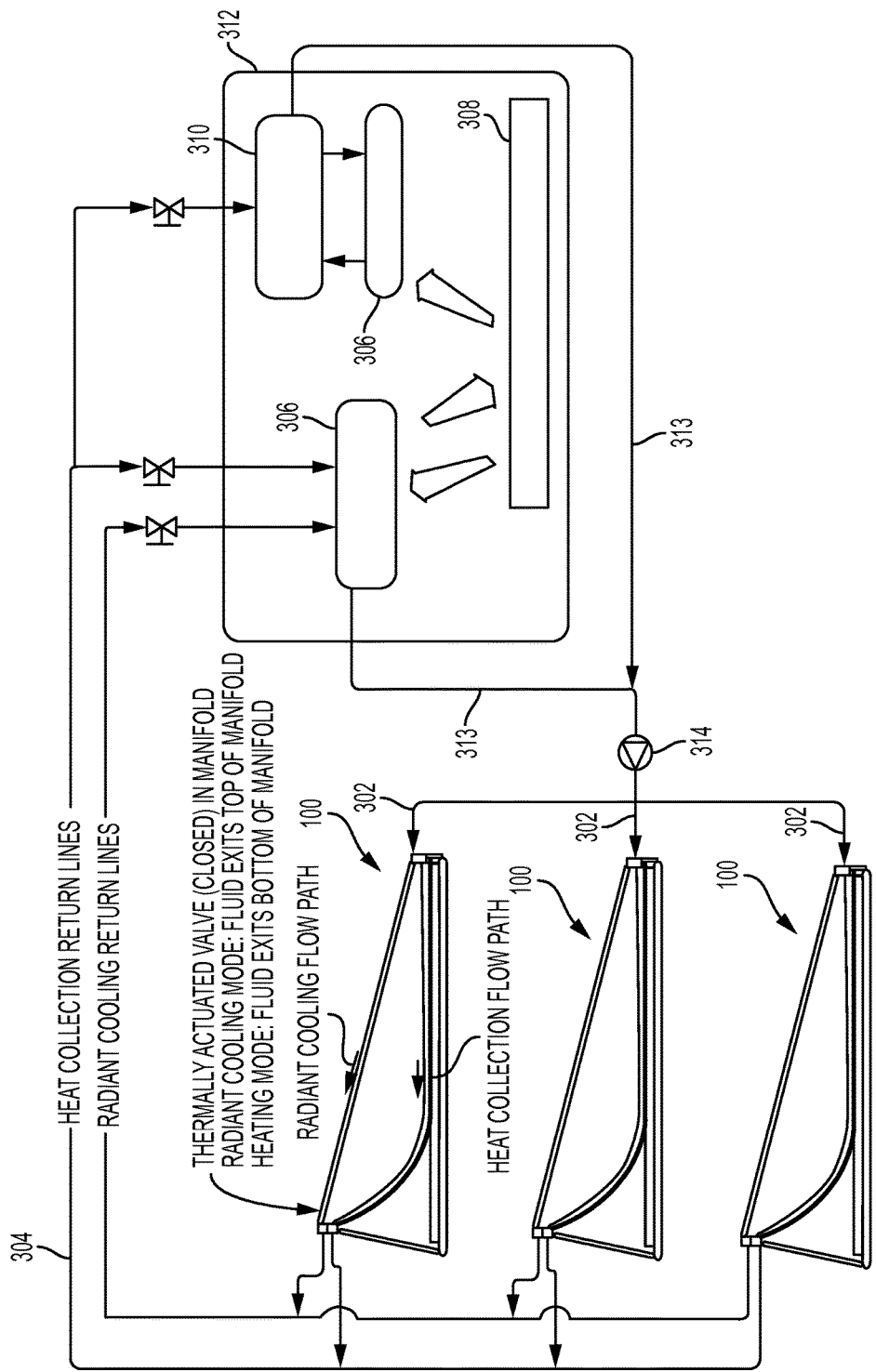
FIG. 10 is a schematic view of an overall solar thermal collector system in accordance with certain aspects of an embodiment of the invention.

FIG. 10 provides a schematic flow diagram showing an arrangement of multiple modules 100 configured as above. As shown in FIG. 10, fluid supply lines 302 supply the working fluid to each module 100, which then proceeds through the module 100. The working fluid may proceed through the module 100 by way of bottom absorber sheet 110 when the system is operated in a heating mode, and may alternatively proceed through the module 100 by way of top glazing sheet 102 when the system is operated in a radiant cooling mode. In a heating mode, the working fluid exits the bottom of manifold 200 into a heat collection return line 304, from which it may be supplied to ceiling mounted radiators 306 that may be configured to radiate heat towards a lower surface of a workspace 312, such as a concrete slab 308, and/or to cooling equipment 310 within the workspace 312 at which the system is installed. The particular configuration of such cooling equipment 310 may be configured as deemed appropriate by persons skilled in the art and is beyond the scope of the instant disclosure, and is therefore not described further here. It is noted, however, that such cooling equipment may likewise be placed in fluid communication with ceiling mounted radiators 306, which may likewise be configured to collect heat radiated from a concrete slab 308. The working fluid is then returned to modules 100 from workspace 312, passing through return lines 313 to pump 314 for resupply through fluid supply line 302 back to the modules 100.

FIG. 11 shows a close-up view of flow into and through upper north manifold 200 from glazing sheet 102 and from absorber sheet 110 in various operational modes. More particularly, FIG. 11a shows the flow in a radiating cooling operational mode, in which the working fluid flows from top glazing sheet 102 into a top portion of upper north manifold 200, and outward through a fluid coupling 204 into a radiant cooling return line 305 (FIG. 10) in those cases in which the modules 100 are to be used for radiant cooling. In this case, the working fluid flows under pump power or thermosiphon effect to ceiling mounted radiators 306 that may be configured to receive heat radiated from the lower surface of a workspace 312, such as concrete slab 308, and then returns to module 100 through supply lines 302 and back through top glazing sheet 102 to radiate the heat collected from ceiling radiators 306 (and in turn heat collected from slab 308) to the sky. Likewise, FIG. 11b shows the flow in a heat collection operational mode, in which the working fluid flows by pump power from bottom absorbing sheet 110 into a bottom portion of upper north manifold 200, and outward through a fluid coupling 204 into heat collection return line 304 (FIG. 10), as discussed above. Further, FIG. 11c shows the flow in a pumped flow, temperature regulation mode, in which the working fluid is supplied under working pressure from pump 314 to the modules 110, with the working fluid flowing through both upper glazing sheet 102 and bottom absorber sheet 110, into upper north manifold 200 and outward through a fluid coupling 204 into heat collection return line 304 (FIG. 10). Still further, FIG. 11d shows the flow in a thermosiphon temperature regulation mode (discussed in greater detail below), in which the working fluid within a single module recirculates through the fluid path of the module, and more particularly through lower absorber sheet 110, into upper north manifold 200, into top glazing sheet 102, into lower south manifold 300, and back into lower absorber sheet 110 as a result of a thermosiphon created when the working fluid becomes stagnant in the module 100 and heats at least a portion of the module beyond a pre-designated design threshold.

Modules 100 are also preferably configured to passively manage their temperature to within the limits of the plastic material that forms the module 100.

In the system described herein, the material with the lowest service temperature needing to be protected is the center polycarbonate sheet that forms absorber sheet 110, which has a maximum allowable temperature of about 260° F. The configuration for self-regulation of panel temperature is shown in the schematic views of FIG. 12. In this temperature regulation configuration, the upper glazing sheet 102 is also filled with the working fluid and is hydraulically connected to the lower absorber panel 110 at each of the upper north manifold 200 and lower south manifold 300. Under normal pumped flow conditions, the working fluid enters the lower south manifold 300 and flows upwards through the absorber sheet 110, exiting through the upper north manifold 200, as shown in FIG. 12a. Although the upper glazing sheet 102 is also connected to the lower south manifold 300, at low temperatures there is no flow in the upper glazing sheet 102 due to the action of a thermal actuating valve (described below) in the upper north manifold 200 that hydraulically isolates the two panels 102 and 110 at low temperature. When the temperature in the upper north manifold 2000 is below the critical temperature, the absorber sheet 110 and glazing sheet 102 are hydraulically isolated so that the flow goes through the lower absorber sheet 110 while the upper glazing sheet 102 is stagnant with no flow. Because the temperature of the fluid increases as it flows through the lower absorber sheet 110, the upper north manifold 200 has the highest temperature of any location on the module. Thus, the thermal actuating valve is located in this upper north manifold 200. As the valve opens up with increasing temperature (details of the valve action are described below), some flow will be allowed to pass through the upper glazing sheet 102 and mix with the fluid passing through the lower absorber sheet 110 before exiting the upper north manifold 200, as shown in FIG. 12a. If the temperature continues to increase, the flow through the upper glazing sheet 102 and the lower absorber sheet 110 will be approximately equal. The flow of hot working fluid through the upper glazing sheet 102 provides a strong cooling effect on the system, since the upper glazing sheet 102 is directly exposed to the environment. This negative feedback that is established effectively places an upper limit on the possible temperature of the fluid and of the lower absorber sheet 110 itself.

The previous paragraph describes the temperature regulation configuration shown in FIG. 12a under pumped flow conditions. It is preferable, however, that a temperature regulation system be completely passive and thus not count on the functioning of any other mechanical or electrical device. Therefore, the temperature regulation system should also work in the case where there is no pumped flow, such as during a power outage, blockage, other operational failure, or during installation. In the absence of pumped flow, an adequate amount of fluid flow within the panels can be induced using the thermosiphon effect, as shown in FIG. 12b, to bring the heat from the lower absorber sheet 110 to the upper glazing sheet 102 where it can be dissipated. When the fluid temperature rises close to the design limits of the module 100, the thermally actuated valve operates as described above, fluidly connecting the upper glazing sheet 102 and the lower absorber sheet 110 at each end to form a closed fluid loop. The module 100 is configured such that the higher and lower temperature fluid regions of the loop are physically separated from each other and the flow paths are oriented in a vertical direction, such that a differential in the pressure between the high and low temperature vertical columns generates a thermosiphon potential to drive fluid around the loop. In the configuration shown in FIG. 12b, the upper glazing sheet 102 is inclined, and the lower absorber sheet 110 is not planar, but takes advantage of the flexible nature of the polycarbonate sheet to take on a curve on the north end of the absorber sheet 110 (i.e., the end of absorber sheet 110 closest to upper north manifold 200). This causes the thermosiphon potential to be driven by the difference between the average temperature of the upper glazing sheet 102 and the average temperature of only the inclined portion of the lower absorber sheet 110. With the flow in the clockwise direction, the temperature in the inclined portion of the lower absorber sheet 110 will be much higher than the average temperature of the entire absorber sheet 110, and so much more thermosiphon potential can be generated. With this flow configuration, a tilt of only 10° to 15° in upper glazing sheet 102 is required to generate adequate thermosiphon flow to maintain the temperature limits.

Any fluid may generate thermosiphon pressure under the right conditions; however, three properties of the particular working fluid described herein are significant to achieving meaningful flowrates: high density, high coefficient of thermal expansion, and low viscosity. The preferred working fluid used in the system described herein is PDMS (described in greater detail below), which has a very high coefficient of thermal expansion, roughly 5 times that of water, combined with a density that is only 15% less than water. The viscosity is much higher than water at room temperature, but at the operating temperatures of a solar thermal system, it is comparable to that of water. This makes this thermal fluid particularly suited to thermosiphon applications, because the pressure available due to the thermosiphoning effect is proportional to the coefficient of thermal expansion of the liquid, the density of the liquid, and the temperature difference between the hot and cold fluid lines.

Two additional configurations for achieving the thermosiphon flow are shown in FIGS. 12c and 12d. FIG. 12c shows a "box" configuration in which the module 100 is mounted in a horizontal orientation, and two short vertical risers connect the upper glazing sheet 102 and the lower absorber sheet 110 at each end. If the riser as shown on the left of FIG. 12c is oriented towards the north end of the module, and is painted black so as to absorb some solar energy, there will be a thermosiphon flow in the clockwise direction (as viewed in FIG. 12c) proportional to the temperature difference between the fluid in the two risers, and the height of the risers. The thermally actuated valve is located in the upper north manifold 200 (left side in the drawing). A riser height of about 1 inch per foot of length of panel is preferred to generate adequate thermosiphon flow.

Likewise, as shown in FIG. 12d, the upper glazing sheet 200 and the lower absorber sheet 110 share a common manifold at the top (200) and the bottom (300), and the distance between the two panels is small compared to the size of the panels. In this configuration, the thermosiphon potential is proportional to the average temperature difference between the fluid in the top glazing sheet 102 and the bottom absorber sheet 110, and the angle of tilt of the sheets. Given the properties of the sheets, the working fluid, and the temperature ranges of interest, a module tilt of greater than 35° is preferred to maintain the temperature of the module 100 below design limits. This is the preferred configuration for mounting of modules 100 on inclined or pitched roofs, such as may be used in a typical residential solar thermal hot water system in a single family resident.

As mentioned above, the thermally actuated valve is mounted in the upper manifold 200 on the hot end of the module 100. This will either be the end of the module that is oriented toward the north in the box thermosiphon design, or the upper end of the module using either of the other two configurations discussed above. The main function of the valve is to hydraulically isolate the upper glazing sheet 102 from the lower absorber sheet 110 when below the critical temperature, and to allow flow between the two sheets when above the critical temperature. The thermosiphon pressure is very small (about 0.015 psi) compared to pumped flow pressures (about 10 psi), such that it may be difficult to support axial flow along the manifold because the small cross-sectional area of the manifold compared to the upper glazing sheet 102 and the lower absorber sheet 110 would result in excessive pressure drop. Therefore, in the thermosiphon case, the valve is designed to allow flow to enter from the lower absorber sheet 110 and pass vertically through the valve to enter the upper glazing sheet 102.

Figure 13:
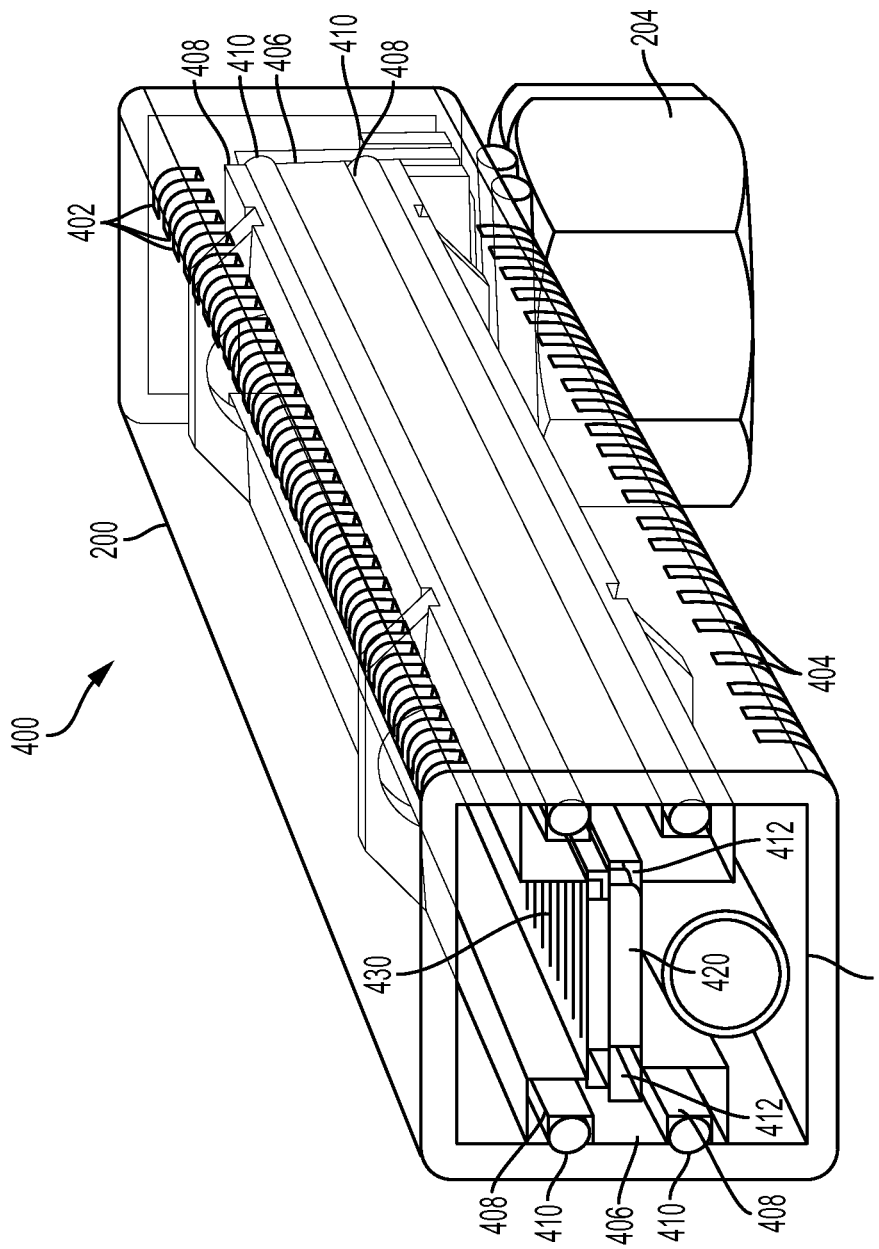
FIG. 13 is a detailed perspective view of a thermal actuated valve for use with the solar thermal module of FIG. 2.

FIG. 13 provides a schematic view of thermally actuated valve (shown generally at 400) positioned within upper north manifold 200. The valve 400 divides the upper north manifold 200 into an upper cavity and a lower cavity. The upper cavity is in fluid communication with the upper glazing sheet 102, and the lower cavity is in fluid communication with the lower absorber sheet 110. The flow area on the interior of upper manifold 200 is opened to the fluid in the upper glazing sheet 102 by providing a series of slots 402 along the upper, corner edge of the manifold 200. Similarly, the flow area on the interior of upper manifold 200 is opened to the fluid in the lower absorber sheet 110 by providing a series of slots 404 along the lower, corner edge of the manifold 200. Segments of solid material are provided between slots 402 and between slots 404, and are provided to maintain the shape of the manifold 200 while allowing fluid to flow from the sheets into the interior of the manifold 200.

To assemble the valve 400, two side rails 406 are first inserted into the preferably square polycarbonate tube of manifold 200. Each rail may have preferably two grooves 408 cut along its length facing the interior walls of the manifold 200, and each groove 408 preferably holds a linear rubber gasket 410. A lower valve plate 420 is inserted into an interior groove 412 on the inside of each rail 406, which forces the two rails 406 towards the interior walls of the manifold 200, which in turn seats the linear rubber gaskets 410 and fluidly separates the upper and lower cavities on the interior of manifold 200. A second upper valve plate 430 is inserted just above the lower valve plate 420; this upper valve plate 430 is sized so as to provide sufficient clearance between the outer edges of upper valve plate 430 and the interior walls of side rails 406 so that it easily slides axially in the manifold 200. In addition, it operates in a bath of PDMS, otherwise known as "silicone oil" (i.e., the working fluid), which is an excellent lubricant. A thermal actuator 440 may be provided just below the lower valve plate 420, which may be used to move the upper valve plate 430 based on temperature. The function of each of these components is described below.

The actuator 440 is preferably configured as a long cylindrical rod immersed in the working fluid in the lower portion of the manifold 200. The fluid exiting the upper, hottest portion of the absorber sheet 110 bathes the actuator 440 in fluid so that the temperature of the rod is within a few degrees of the hottest fluid in the module 100. The rod is preferably made of a material that has a relatively high coefficient of thermal expansion, and which also maintains adequate stiffness at the upper service temperature. Polyvinyldiene fluoride (PVDF), and polytetrafluoroethylene (PTFE) are suitable materials, with a linear expansion of about ¼" to ⅜" between 180° F. and 230° F. for a 48" to 60" rod. PVDF is preferred because it has a higher coefficient of thermal expansion and it maintains a higher compressive modulus at the service temperature. As shown in the close-up view of one end of actuator 440 of FIG. 14, the PVDF rod 442 is inserted into a sheath 444 formed by a copper tube that is closed on one end. The sheath 444 supports the rod 442 around the sides, giving it compressive strength and preventing buckling. Copper is preferred for the sheath 444 because it has the highest thermal diffusivity of any non-precious metal, which reduces the time lag in the temperature of the actuator 440.

Figure 14:
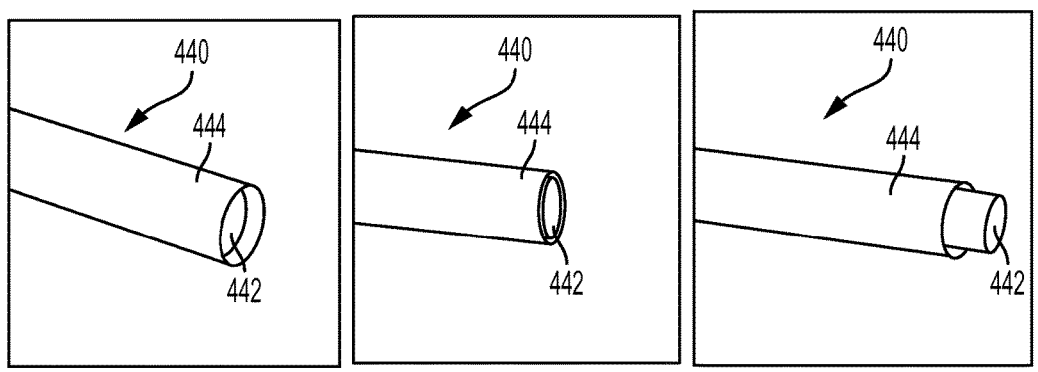
FIG. 14 is a close-up perspective view of an actuator for use with the thermal actuated valve of FIG. 13.

When the average temperature of the rod 442 is below the critical temperature, the end of the rod 442 is retracted inside the copper tube sheath 444 as in the left view of FIG. 14. The length of the rod 442 is selected so that at the lower end of the critical temperature range (preferably about 180° F.), the flat end of the rod 442 is just flush with the open end of the sheath 444. As the temperature increases from the lower part of the critical range to the upper part, the rod 442 extends beyond the end of the tube 444 and provides an actuating force over a distance of about three eighths of an inch.

Figure 15:
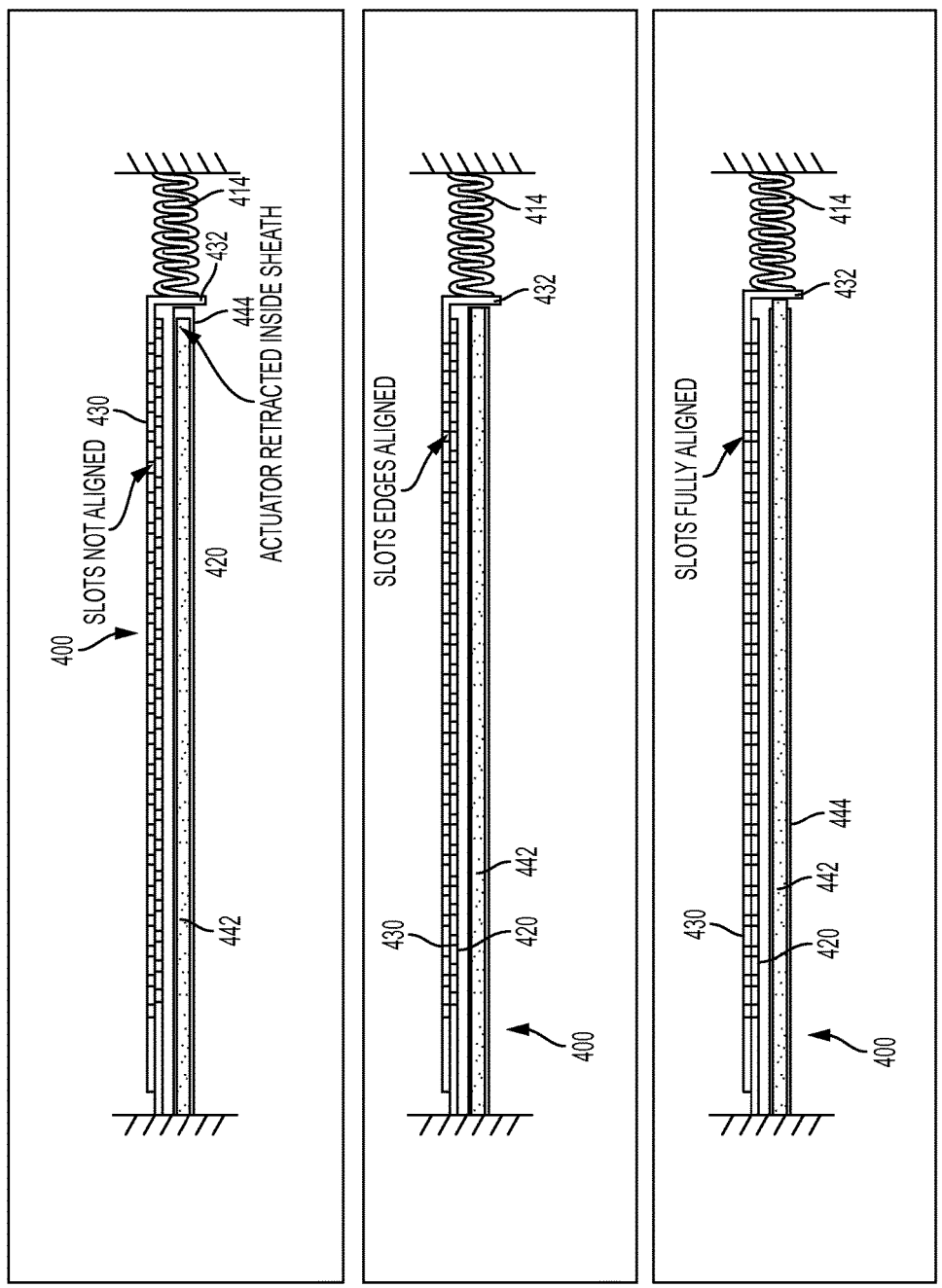
FIG. 15 is a schematic view of the operation of the thermal actuated valve of FIG. 13.

As shown in the schematic view of the thermally actuated valve 400 of FIG. 15, a tab 432 attached to the upper plate 430 is held between the balanced forces of the actuator 400 and a reacting spring 414. The spring 414 holds the tab 432 against the end of the actuator rod 442, or at the end of the sheath 444 if the actuator rod 442 is retracted inside the sheath 444.

Figure 16:
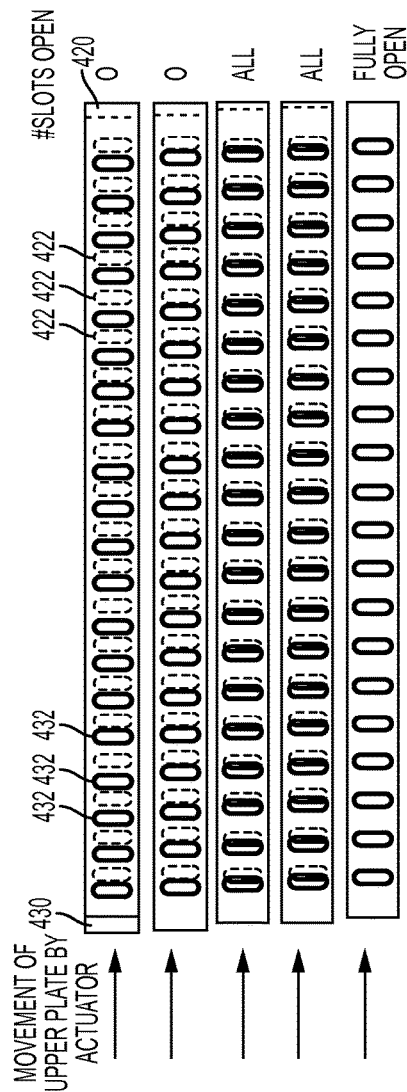
FIG. 16 is a top view of valve plates for use with the thermal actuated valve of FIG. 13.

The valve body consists of lower valve plate 420 and upper valve plate 430, which again are mounted so as to extend horizontally across the manifold 200. The bottom valve plate 420 is fixed and, as mentioned above, is mounted such that it has a compression fit on the sides with side rails 406 so that no flow can go around the bottom valve plate 420. The bottom valve plate 420 has a regular series of slots 422 cut into it, as shown in the schematic view of FIG. 16. The width of each slot 422 is equal to the stroke of the thermal actuator 440 as it moves from the lower to upper critical temperature range, about ⅜". The upper plate 430, located on top of the lower plate 420, may have a matching pattern of slots 432 and is held against the end of the thermal actuator 400 by the spring 414. At lower temperatures, when the tab 432 is held against the end of the sheath 444, the slots 422 and 432 are not aligned such that no flow passes through the slots. As the temperature increases, and the thermal actuator moves the upper plate 430, the slots 422 and 432 begin to align, which opens a flow area proportional to the temperature of the actuator, which in turn allows flow to pass perpendicular to the plates.

Figure 17:
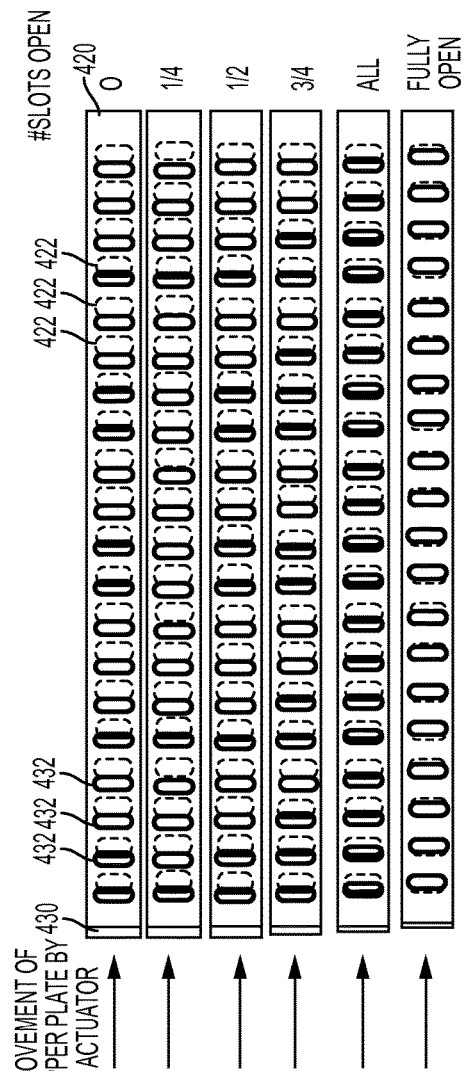
FIG. 17 is another top view of valve plates for use with the thermal actuated valve of FIG. 13.

In the simplest implementation, the slot pattern of the upper and lower plates 430 and 420, respectively, are identical. This allows for function of the valve with relatively simple fabrication techniques. One challenge with this configuration, however, is that once the critical temperature is reached, all of the slots open at the same time. Because the temperature of the fluid in the upper portion of manifold 200 can be much lower than the temperature of the fluid in the lower portion of manifold 200, a sudden influx of cool fluid could quench the actuator 440, causing it to suddenly contract and resulting in instability. By having a variable spacing of the slots 432 in the upper plate 430 as shown in FIG. 17, the slots can open in groups, for example 25% at one time, then another 25%, etc., allowing for a more gradual transition of the flow and less instability. In order to accommodate the variable spacing of slots 432 in upper plate 430, the width of the slots 422 in the lower plate 420 is increased so that the slots that open first do not begin to close again when the valve approaches the fully open condition.

The thermally actuated valve has the advantage of being housed entirely in the upper north manifold 200, and if the end plate of the manifold 200 is removable, the valve can be maintained in the field without further disassembly of the module.

Figure 18:
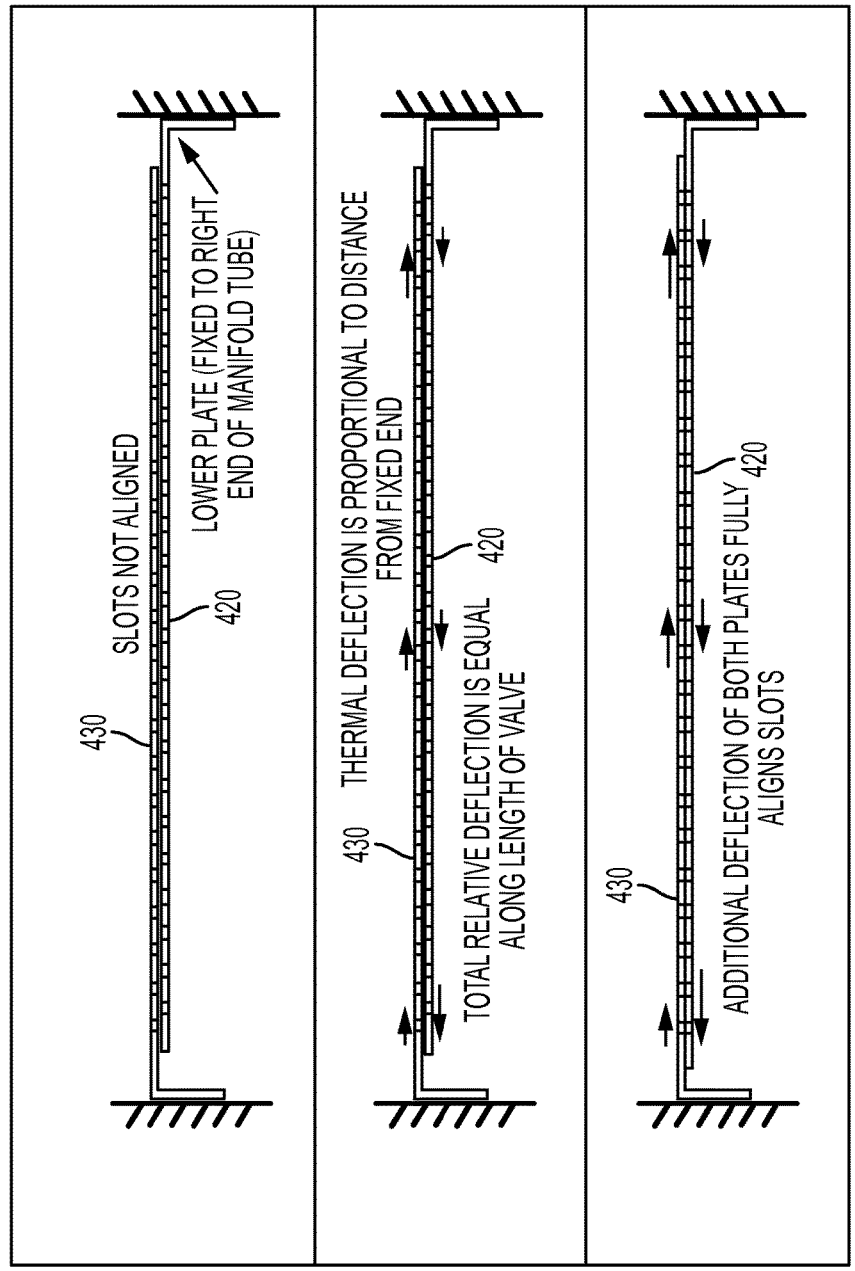
FIG. 18 is a schematic view of the operation of the thermal actuated valve of FIG. 13 in another configuration.
Figure 19:
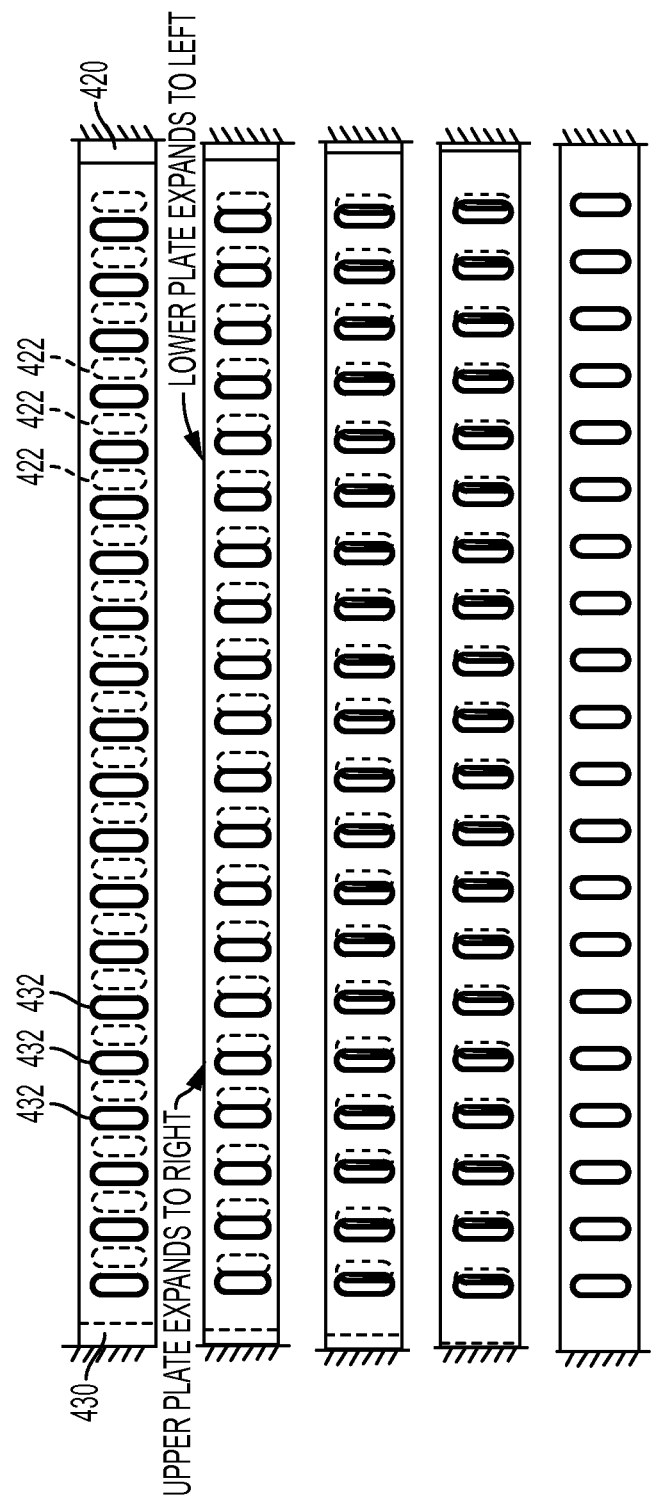
FIG. 19 is a top view of valve plates for use with the thermal actuated valve of FIG. 18.

Thermally actuated valve 400 may optionally be provided without actuator 440, in which case opening of the thermally actuated valve 400 is dependent solely upon expansion of upper valve plate 430 and/or bottom valve plate 420. More particularly, material that undergoes thermal expansion expands in every dimension. Because the width of the thermally actuated valve 400 is much smaller than its length, the expansion may be approximated as being linear. If one end of a long piece of solid material is fixed, the axial deflection of any one point is proportional to its distance from the fixed end. That is, a point on a rod that is close to a fixed end of the rod will not deflect much at all, while a point on the opposite end will deflect the most. In order to achieve an even amount of flow across the whole length of the thermally actuated valve 400, it is important that the valve open area be relatively constant over the length. In a configuration that does not make use of actuator 440, both the upper valve plate 430 and the lower valve plate 420 are fixed at opposite ends, as shown in the schematic view of the valve of FIG. 18 and the schematic view of valve plates 420 and 430 of FIG. 19. In this configuration, valve plates 420 and 430 are allowed to expand in opposite directions so that the deflection of the two plates relative to one another is equal, and so that the open valve area will be the same across the whole length of the valve.

Below the critical temperature, and as shown particularly in FIGS. 18*a* and 19*a*, the ends of the two plates 420 and 430 are fixed at opposite ends of the manifold 200, such that the slots 422 and 432 are fully unaligned and there is no free flow area. As the temperature begins to rise, the top valve plate 430 expands to the right and the lower valve plate 420 expands to the left (as shown particularly in FIGS. 18*b* through 18*c* and in FIGS. 19*b* through 19*e*). The deflection is proportional to the temperature change and the distance from the fixed end, such that the total relative deflection is the same along the length. The slots 422 and 432 are arranged such that when the upper end of the critical temperature range is reached, the slots are fully aligned, as shown in FIGS. 18*c* and 19*e*, and the flow area is open along the whole length of the valve.

This configuration has the advantage of requiring only two moving parts: the upper valve plate 430 and the lower valve plate 420 themselves. The elimination of the thermal actuator 440 opens up more of the lower half of the manifold 200 for fluid flow, reducing the pressure drop and reducing pumping power.

The selection of the particular fluid to serve as the thermal working fluid is important in this ultra-low-cost solar collector design. The working fluid must have low viscosity, adequate thermal conductivity and heat capacity, be non-toxic, have very low vapor pressure at high temperatures, and most importantly be chemically compatible with the polycarbonate material. One fluid that meets all these requirements is polydimethyl siloxane, or PDMS, commonly known as silicone oil. It is also colorless, odorless, and non-toxic, and also provides good lubrication of the thermal valve sliding surfaces.

Moreover, the fluid type used as the working fluid may also offer performance advantages. Most solar thermal working fluids are water-based with some type of anti-freeze added. The PDMS fluid has two main advantages compared to water. First, water is not compatible with polycarbonate at elevated temperatures since the water can penetrate the plastic and disrupt the chemical bonds. Second, the vapor pressure of water rises rapidly with temperature, which requires that the fluid passages be made of high tensile strength materials such as metals and that the cross section must generally be round to contain pressures as high as 150 psi. PDMS fluid has a very low vapor pressure even at elevated temperatures, enables the use of fluid channels that are made of plastic, and also of arbitrary cross section. In the system disclosed herein, the flow is essentially planar across the very thin absorber sheet 110. The hydraulic diameter in the direction of the flow is one to two orders of magnitude greater than that corresponding to a typical serpentine flow solar collector or a pool heater with small flow passages. The larger hydraulic diameter implies greatly reduced flow velocities that then reduce the pressure drop across the module by an order of magnitude compared to typical solar panels, resulting in lower pumping loss and further reductions in static pressure. The lower velocity of the fluid across the absorber surface does also reduce the heat transfer coefficient between the absorber surface and a working fluid. However, the much larger heat transfer area more than makes up for the lower heat transfer coefficient, so that the temperature differences between the fluid and the wall are comparable to standard collectors employing the serpentine tube arrangement.

Figure 20:
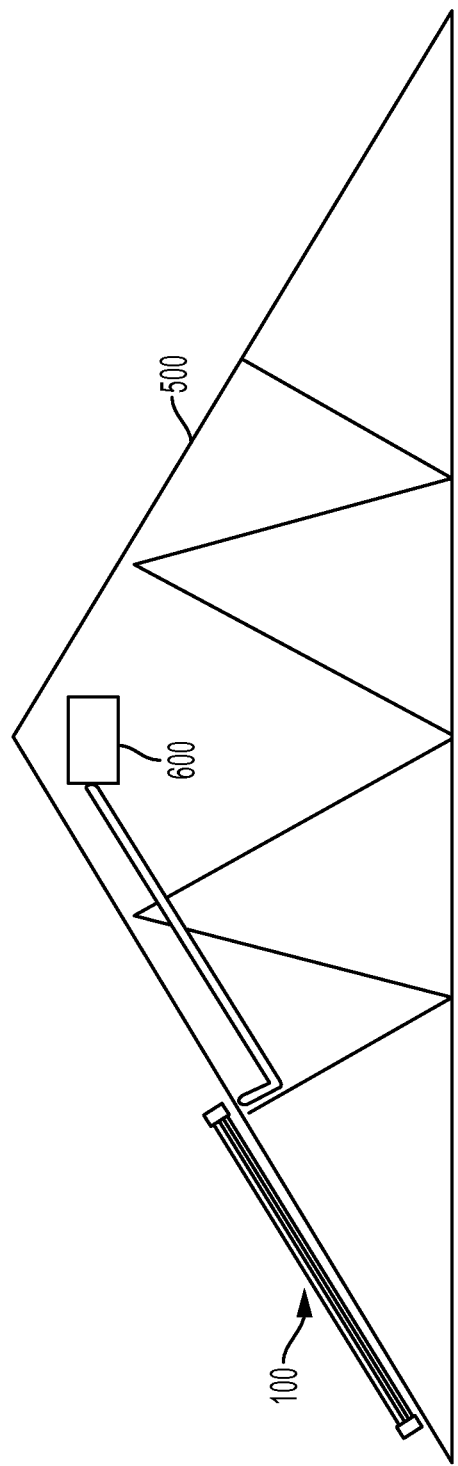
FIG. 20 is a cross sectional view of a solar thermal collector system according to further aspects of an embodiment of the invention.

A residential solar thermal system is shown in FIG. 20, which embodies all of the improvements described above. The system of FIG. 20 and described in the following description provides a solar water heating system for a pitched roof construction, such as a residential single family home application, with much lower cost, better reliability, and higher efficiency than prior residential solar water heating systems, with near-constant water supply temperature. The residential solar thermal system described herein makes use of the same multi-wall polycarbonate material as the commercial/flat roof module 100 described above, but also optionally makes use of thermosiphoning as the motive force, and thermal storage modules 600 that are mounted in the structure, for example in the attic of the structure 500.

As described above, the thermosiphon temperature regulation system could be provided in three slightly varied configurations in a flat roof, typically commercial installation. Because residential applications in general begin with a naturally sloping roof, the third option described above for thermosiphon temperature regulation systems is preferable (i.e., having a sloped solar thermal collector module), as shown in detail in FIG. 21. This operates with the same passive temperature regulation mechanism using the thermally actuated valve 400 in upper manifold 200, which upper manifold 200 is in fluid communication with top glazing sheet 102 and bottom absorber sheet 110 spaced apart from and below glazing sheet 102, both of which are likewise in fluid communication with lower manifold 300. Beneath absorber sheet 110 is again a panel of rigid insulation 114, and the entire assembly is contained within a housing of the module 100 that is configured to sit in an angled orientation flat against a pitched roof. Heat collection return line 304 attaches to a fluid coupling on upper manifold 200 to move heated working fluid from solar thermal collector module 100 to thermal storage modules 600, and fluid supply line 302 attaches to a fluid coupling on lower manifold 300 to feed returning working fluid back from thermal storage modules 600 to thermal solar collector module 100, all as described above with respect to the flat roof system configuration. Likewise, return lines 313 may again be provided to direct working fluid that has passed through thermal storage modules 600 back to fluid supply line 302, again optionally through a pump 314.

Figure 21:
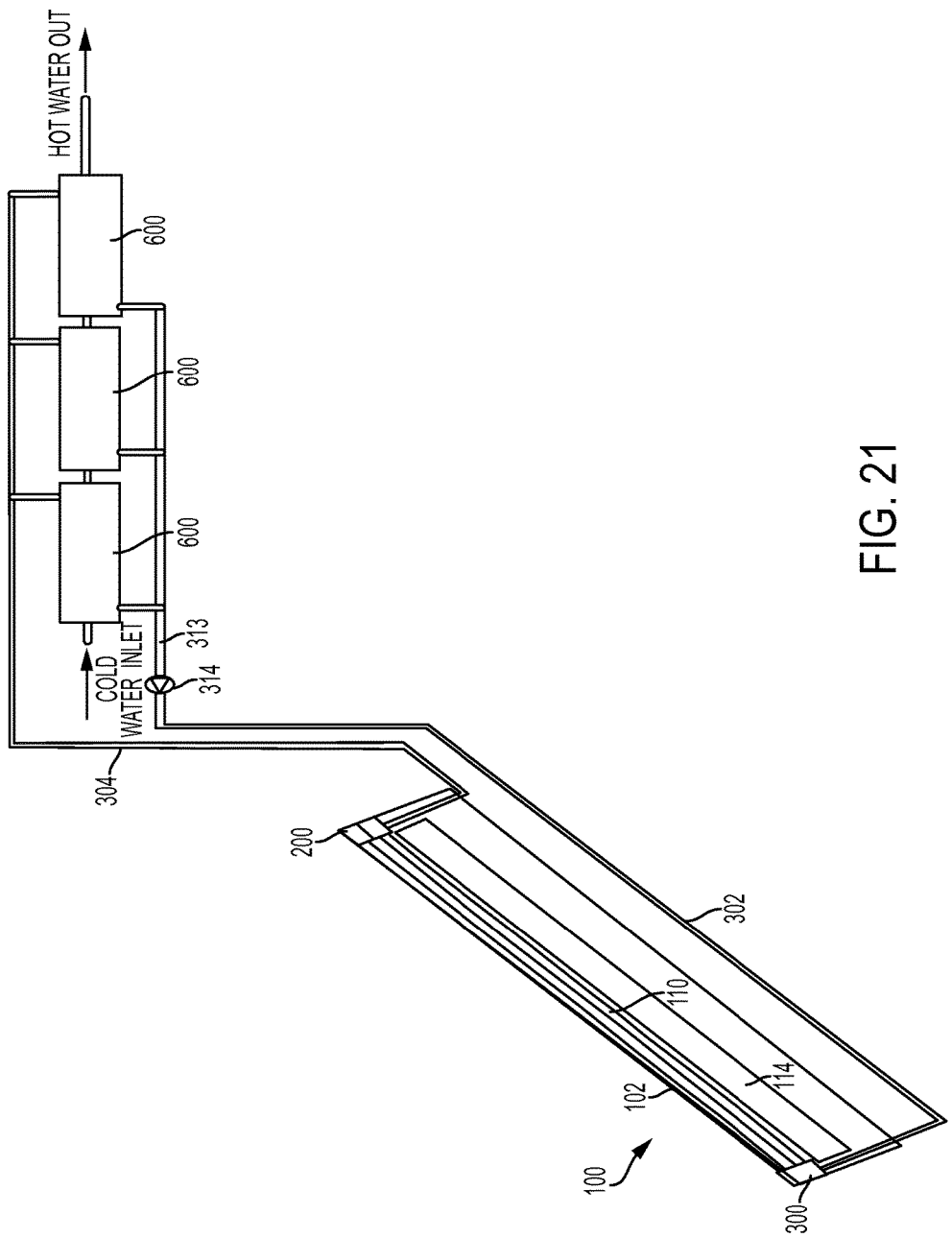
FIG. 21 is a detailed schematic view of the solar thermal collector system of FIG. 20.

Maintaining the thermal storage media in a location physically above the collector (as shown in FIGS. 20 and 21) also allows for the possibility of using passive thermosiphon pressure to drive the flow in the fluid lines between the collector and storage. The thermosiphon potential of the solar thermal collector module 100 has been described above with reference to the passive temperature regulation function of the module. In this embodiment, the thermosiphon potential is used for both the temperature regulation system as previously described, and also as the prime motive force for moving the working fluid between the collector and the thermal storage module which feeds the load. The thermosiphoning method has the advantage of eliminating active elements such as pumps, sensors and controls to circulate the fluid through the collector modules 100 and up to the thermal storage modules 600. Adequate thermosiphon flow can be generated if the storage modules 600 and the collector modules 100 are separated by at least four feet of vertical height using fluid lines ¾" in diameter. The height difference is easily achieved on larger homes in northern locations where the roofs are more steeply pitched. For smaller homes with less steeply pitched roofs, the same system design can utilize a conventional or PV-powered DC pump, with the disadvantage of more cost and lower reliability, but with the advantage of reduced pipe diameters and more flexibility on component location. For example, it may be more convenient to mount the thermal storage modules 600 directly on the floor of the attic space, directly over the load bearing walls, and below the insulation layer on the floor of the attic. This would insulate the thermal storage modules 600 from the air in the attic and prevent freezing of the water in the module in the event of extreme cold or a loss of heat in the attic.

Figure 22:
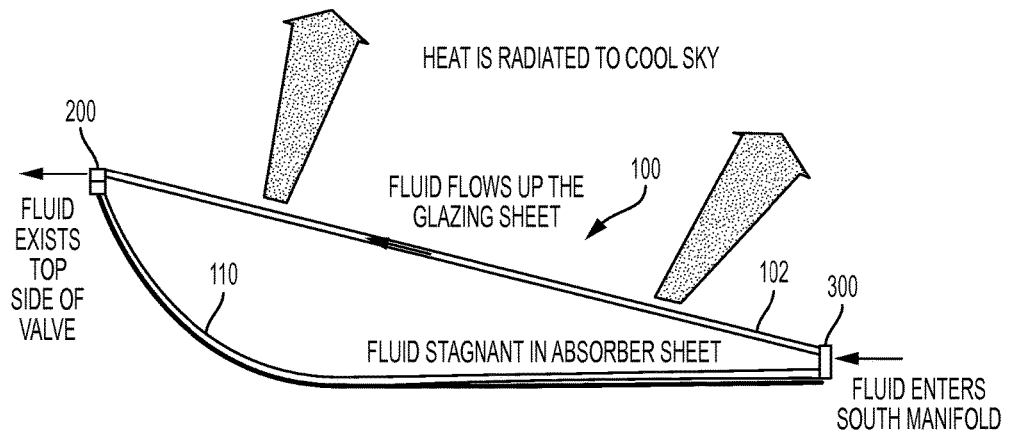
FIG. 22 is a schematic view of flow through a solar thermal module according to aspects of an embodiment of the invention in a radiant cooling operational mode.

Both the flat roof, commercial configuration and the pitched roof, residential configuration of the solar thermal collector 100 may be suitable for dual use as a night sky radiant cooling system. In each case, and with reference generally to FIG. 22 showing the configuration of a module 100 for use on a commercial, flat roof building, upper glazing sheet 102 provides an opportunity to use the same module for thermal collection and for night sky radiant cooling. The thermal working fluid described above for use in thermal collection has some key properties that make it very suitable as a radiant cooling fluid in the system described herein. First, it has the remarkable property of being nearly transparent to all electromagnetic radiation in the frequency range from ultraviolet to near infrared. Because of this property, there will be very little attenuation of the solar energy that passes through the glazing sheet 102 that is filled with the fluid. Second, it has a freezing point of about −50° F. which is below the minimum temperature for almost all US applications.

The proper flow configuration for night sky radiant cooling can be achieved by installing a separate fluid fitting in the manifold that houses the thermal actuated valve—i.e., upper manifold 200. In both the heating and radiant cooling modes, fluid enters the panel from the lower manifold 300. To utilize the module 100 as a heat collection device, the fluid exits the upper manifold 200 on the lower side of the thermal actuated valve 400. To use the module 100 as a radiant cooling device, a second fitting is installed on the upper side of the upper manifold 200 which allows the flow to enter the lower manifold 300, flow through the upper glazing sheet 102, and exit the module 100, bypassing both the lower absorber sheet 110 and the thermally actuated valve 400 in upper manifold 200 which would be closed due to the low temperature conditions.

Figure 23:
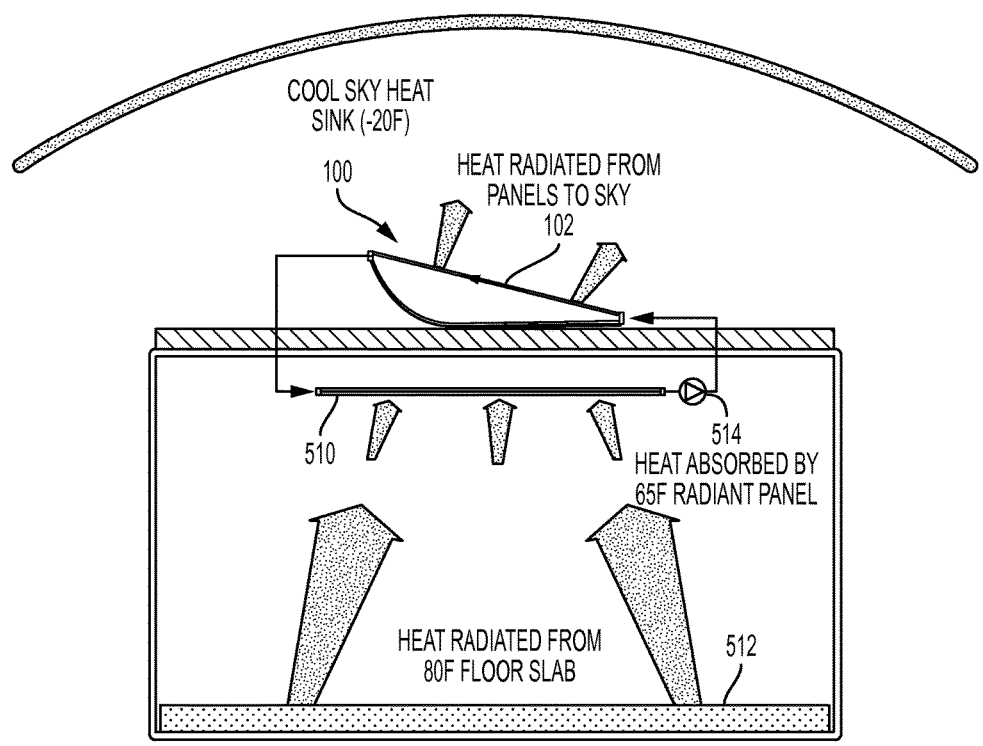
FIG. 23 is a schematic view of an overall solar thermal system operating in a radiant cooling operational mode in accordance with certain aspects of an embodiment of the invention.

For nighttime cooling effect to have the biggest impact on the building cooling load, some degree of storage of the heat absorbed from the building is preferably. This is because the cooling load at night can be very low or often zero when the cooling capability is available. It is technically possible to store the cooling effect using conventional thermal storage techniques such as water tanks. However, a relatively small temperature difference of only 10 to 20° F. is available, and in order to be cost-effective, night sky radiant cooling should be done at very low cost because the flux density of the cooling is very low compared to that of solar heat collection. In commercial configurations, the largest thermal storage mass that is available for diurnal storage of cooling effect is the concrete slab floor. Radiant heating and cooling systems have been commonly available for many years that circulate hot or cold fluid through pipes that are embedded in the concrete slab floor to use the floor material as both a thermal storage medium and a space conditioning delivery surface. Again, the relatively modest flux density of night sky radiant cooling calls for a much lower cost delivery of the cooling effect to the storage medium. Direct radiant energy exchange between indoor radiant panels and the slab floor can provide a very low cost thermal storage mechanism, but very large radiator areas are required due to the low temperature differences available. The same basic panel design used for glazing sheet 102 and absorber sheet 110 can be adapted to provide just such a low cost radiator system by using a single twin wall polycarbonate sheet 510 suspended from the ceiling joists, as shown in FIG. 23, and circulating the fluid that is cooled by the night sky radiators through the module 100 and suspended sheet 510.

The night sky radiant cooling capability of the multifunction thermal module 100 can be used to provide useful cooling to a commercial building as in the following system. First, the near-horizontal mounting angle of the commercial rooftop panels is already the optimal angle for night sky radiant cooling, because the radiator has practically no view to any warm objects or the warm rooftop and sees only the sky. A large fraction of the building roof surface may be outfitted with these multifunctional thermal modules 100, and a corresponding area of interior radiant cooling panels 510 is installed inside the building just below the roof. The surface of the radiant panels 510 may be painted white to also improve the reflective environment for the building lighting. These radiant cooling panels 510 may be made of the same low cost multiwall polycarbonate material with a rigid foam backing similar to the outdoor thermal panels, but eliminating the central thermal absorber sheet 110. As night falls and the temperature of the outside glazing sheets 102 falls below the temperature of the concrete slab floor 512 of the building, thermal fluid is circulated (such as through a pump 514) between the outside module 100 and the inside radiant cooling panels 510 at such a flow rate that maintains the inner and outer panels at essentially the same temperature. In this way, the fraction of the roof area that is outfitted with thermal modules 100 becomes essentially transparent to infrared radiation, and heat can be radiated from the concrete slab floor 512 into space.

Figure 24:
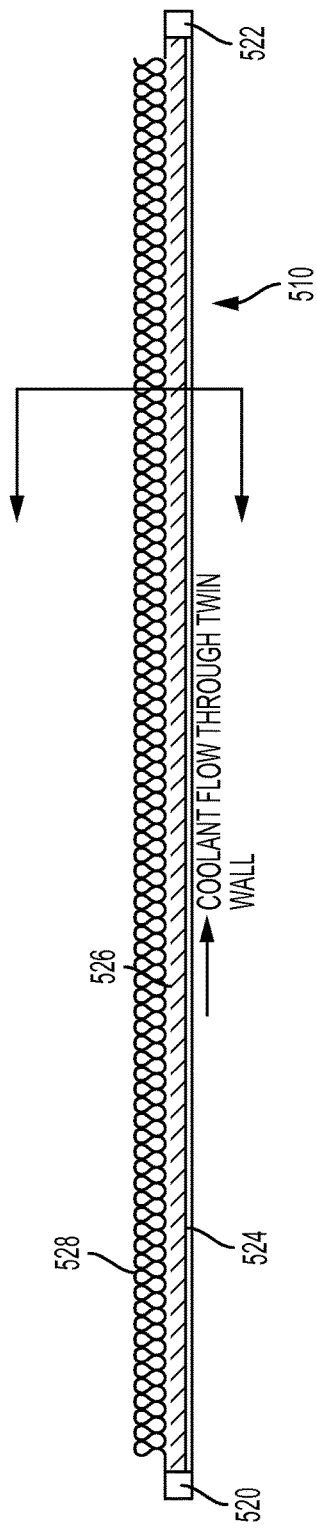
FIG. 24 is a close-up view of a radiating panel for use with the system of FIG. 23.
Figure 25:
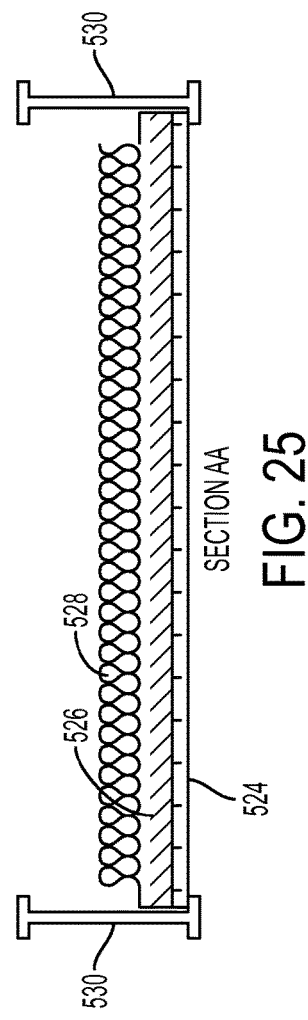
FIG. 25 is a cross-sectional view of the radiating panel of FIG. 24.

FIG. 24 provides a detailed side view of a radiant cooling panel 510, and FIG. 25 provides a sectional view of radiant cooling panel 510 along section line A-A of FIG. 24. Working fluid may be pumped from thermal module 100 into inlet manifold 520, flow through twin wall polycarbonate sheet 524 (absorbing thermal radiation from the floor slab 512 as it flows through sheet 524), and exit the radiant cooling panel 510 through outlet manifold 522, from which it is returned to lower manifold 300 on thermal module 100, flows through glazing sheet 102 to radiate heat to the night sky, and flows out of upper manifold 200 on thermal module 100 to return to radiant cooling panel 510. Rigid thermal insulation board 525 is provided on an upper face of sheet 524, and a soft fiber batt thermal and sound insulation 528 is preferably laid on top of insulation board 525.

This radiant cooling system relies on an adequate radiant efficiency of the indoor radiant cooling panels 510. The radiant efficiency is defined as the amount of thermal energy which is transferred via radiation directly from the floor of the building divided by the total amount of energy absorbed by the panel. The energy absorbed by the panel that is not received radiatively occurs by convection and reduces the temperature of the air in the vicinity of the panel. While this provides some cooling, there is no storage to provide cooling the next day. Therefore it is desirable that the velocity of air circulation inside the building be kept to a minimum when the radiant cooling is occurring at night. This keeps the convection heat transfer coefficients for both the radiant panel and the concrete floor to a minimum, which maximizes the radiant heat transfer. Further to this end, near-vertical baffles can be installed around the perimeter of the panel to reduce the natural convection film coefficient.

When the sun rises in the morning and the temperature of the outside thermal module 100 rises above the temperature of the concrete slab floor 512, the pumps 514 are then turned off. A six-inch thick concrete slab floor 512 with radiant coolers 510 covering one half of the building area can be reduced in temperature by 10 to 15° F. over a summer night with a relatively clear sky. The lower temperature of the slab 512 during the day improves the thermal comfort of the occupants of the building by reducing the mean radiant temperature that they experience. The lower radiant temperature also allows the air temperature set point of the building air conditioning system to be set higher while maintaining a constant level of comfort. In order to maximize the amount of heat put back into the slab during the daytime, it is desirable to have a relatively high air velocity across the floor. Circulating fans can be used for this purpose, which also improve the thermal comfort of the occupants and allow even higher air conditioning temperature setpoints.

In a particularly preferred embodiment, a well-designed night sky radiant cooling system for flat roof commercial buildings would consist of the following elements:

1. Thermal modules 100 covering about ⅓ of the roof surface are installed, which can either be dedicated radiant cooling modules or combined radiant cooling/thermal collecting modules 100 as described in detail above. The radiant cooling feature can be added to the thermal collection module simple by providing an additional fluid fitting in the upper manifold 200 and separate fluid lines back to the pump 514.

2. A similar amount of indoor radiant cooling panels 512 are installed inside the building just inside the roof, concentrating in areas where the concrete slab floor 512 is exposed.

3. When a suitable temperature difference exists, working fluid is circulated, which pulls heat radiatively from the slab 512 and radiates it through the thermal module 100 into space. During this time, ventilating fans are turned off assuming the space is relatively unoccupied.

4. During the day, the pumps 514 are shut off and ceiling mounted fans circulate the air to return the heat to the slab 512. Indoor temperature setpoints can be raised by approximately 5° F. to compensate for the additional cooling from the colder floor and the circulating air.

The foregoing system was simulated for the climate zones corresponding to Boulder, Colo. and San Diego, Calif. Under various scenarios of building loads and construction types, cooling loads were reduced by 30 to 50%. When combined with using the thermal modules 100 as thermal collection devices in addition to radiant cooling devices, very favorable economics with paybacks of less than three years are estimated.

The target building type for this system typically has the underside of the corrugated steel roof deck serving as the ceiling of the space. The steel has very low sound attenuation and thus such buildings often have poor acoustics resulting in high ambient sound levels especially in industrial buildings with noise sources. The high surface area of suspended radiator panels 510 offers the opportunity to use the top of the panels as sound attenuation devices. The top of the panels 510 are insulated for thermal purposes already, so simply by addition of a second layer of soft thermal insulation that also has good sound insulation properties, such as cotton or fiberglass batt, the radiator panels 510 can serve an important double function with significant sound attenuation.

The same radiant panels can likewise be used for very efficient heating in the winter. The solar energy captured by the modules 100 can be delivered to the radiating panels 510 to radiate the heat to the floor slab 512 in the reverse of the cooling strategy. A significant advantage of delivering the heat in this way is that the very large surface area of the radiating panels 512 allows the fluid temperature to be much lower than with forced air heating. For example, forced air heating systems typically require an air temperature of 120-140 F, which if driven by solar heat, requires a hot water temperature of 140-160 F. By contrast, the radiator system described here can efficiently supply radiant heat to the floor slab 512 at a fluid temperature of 90-100 F because of the large surface area available. This means that the solar thermal collector 100 can operate 50 degrees cooler than if coupled with a forced air system, providing the same heat at greater comfort. Reducing the solar collector operating temperature improves the thermal collection efficiency substantially. In addition, the radiant system described here provides warm radiant surfaces both above and below the occupied space, and requires no fans that consume power and increase the air velocity around the occupants, which reduces the apparent heating effect.

The foregoing system can work efficiently where the indoor radiant cooling panel has a good view to a concrete floor or other thermal mass with which it can radiantly exchange heat. To enhance the performance of such system, or in cases where there is not a good radiant view to the thermal storage mass, storage media can be integrated into the radiant cooling panel.

Because the radiant cooling panels 510 are suspended from the ceiling of the space, and are made of lightweight material themselves, it is important that any thermal storage media t is combined with the radiant panel 510 likewise be very lightweight. Some building materials have recently become commercially available with integrated phase change materials. These materials are usually made of either paraffin wax or organic salts that have a melting point near the desired air temperature. Generally, these materials have a mass and volume energy storage density several times that of water, and about twenty times that of ordinary building materials such as gypsum.

A general problem with using phase change materials is the ability to transfer the heat to and from the material, especially as the phase change material is transitioning from liquid to solid state. Often, the cost of the material that brings the working fluid in contact with the phase change material with adequate surface area is comparable to the cost of the phase change material itself. Therefore, it is desirable to have a phase change material enclosure that is in intimate contact with both the cooling fluid and the environment.

A modification of radiant cooling panel 510 may thus be provided to incorporate phase change materials at very low additional cost and that integrally incorporate a large heat transfer surface between the fluid and the storage medium. As shown in FIG. 26, the working fluid 540 can be passed through every second or every third passage in the polycarbonate panel 524, with the other passages being filled with phase change material 550 that has a melting point preferably halfway between the collection temperature and the heat rejection temperature. The number of channels filled with the phase change material 550 can be varied from about ⅓ to ⅔ of the channels to customize the amount of thermal storage. The phase change materials 550 have a cost per unit volume that is about equal to the heat transfer fluid. Therefore, this additional thermal energy storage capacity can be added with no additional material cost. Some additional pumping power may be desirable to pump the same amount of fluid through fewer channels.

For an efficient radiant cooling system, it is desirable that the daily heat transfer capacity of the outdoor thermal module 100 be balanced with the daily transfer capacity of the indoor radiant panel 510. Using a phase change material based on paraffin or organic acid in two thirds of the fluid passages and passing the heat transfer fluid through the other third allows intimate thermal contact between the thermal fluid in the phase change material, since the walls that form the cells of the multiwall panel 510 are extremely thin, just three thousandths of an inch thick.

While the above description is particularly configured for a commercial, flat-roof installation, a solar thermal module 100 configured for a pitched roof installation may likewise be configured for dual use as a radiant cooling system. While an exposed concrete slab is generally not available in a residence, in hot and dry climates or in buildings with high internal heat loads, there can be a significant sensible cooling load that can be directly addressed with night sky radiant cooling without storage. A feature of residential applications that makes radiant cooling easier is that it is possible to have a roof that is sloped facing to the east, which can have a degree of radiant cooling even when the sun is above the horizon. For example, a roof surface facing southeast with a slope of 25 degrees will be shadowed from the sun at about 4:30 PM in August at 40 degrees latitude. On a day with low cloudiness (when the cooling load on the building is the highest), by 5:30 PM a net cooling effect is possible from the roof surface. Due to the thermal mass of the building, late afternoon and early evening are the times of peak sensible cooling loads, and the radiant cooling can directly address these loads even without storage.

As with commercial radiant cooling systems, a much greater cooling effect can be achieved if the heat can be pulled from the building during the day, stored, and released gradually to the radiant sky over the entire night time period. In the absence of a readily available part of the building which can be used to store heat, the radiant cooling panels with integral phase change storage can be employed to provide this effect.

FIG. 27 shows a residential radiant cooling panel which is designed to operate with the combined thermal heating and cooling module 100 in its pitched roof configuration. As with the commercial, flat roof configuration, the radiant cooling panels 510 are sized to fit between the ceiling joists 530 which are generally spaced at either 16 or 24 inches apart in single family home constructions. The radiant cooling panels 510 again have fluid passages for the heat transfer fluid 540, and alternately store the phase change material 550 in the remaining cells. Mounted just above the fluid and phase change sheet 524 is a rigid foam insulation board 526, which keeps the radiant panel 524 isolated from the hot air in the attic. The thermally active sheet is in direct contact with the drywall ceiling material 532, and it is possible to reduce the temperature of the ceiling in the upper floor of the house by as much as 20°. With 25% of the roof area covered with multifunctional thermal modules 100, the cooling load on the building can be reduced by 25-35%. If the radiant ceiling panels 510 are placed in 50% of the spaces between the ceiling joists in an alternating arrangement, the gypsum drywall boards 532 contribute an additional 25% of the thermal storage effect (assuming a 4 mm thick multiwall sheet 524 with two thirds of the channels dedicated to phase change material and one third to working fluid passage).

Alternatively, the phase change material could be housed in a spacer panel 528 between multiwall sheet 524 and rigid foam insulation board 526, which would allow more phase change material per unit area and still allow adequate heat transfer between the working fluid and the phase change material.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A solar thermal system operable as a solar thermal collection system and a radiant cooling system, comprising:
   at least one solar thermal module comprising:
      a glazing sheet forming a top surface of said module;
      an absorber sheet on an interior of said module and positioned below and spaced apart from said glazing sheet, said absorber sheet being configured to absorb heat from the sun and to transfer heat to a working fluid in said absorber sheet;
      a first manifold connected to a first end of each of said glazing sheet and said absorber sheet; and
      a second manifold connected to a second end of each of said glazing sheet and said absorber sheet; and
      a thermal actuating valve positioned within said second manifold, wherein said thermal actuating valve fluidly separates a bottom portion of said second manifold from a top portion of said second manifold and controls flow between said bottom portion and said top portion;
   wherein said module is installed externally on a roof of a building, said system further comprising a radiating panel in fluid communication with said module, wherein said radiating panel is suspended from a ceiling on an interior of said building, wherein said radiating panel is positioned to absorb heat generated from a concrete slab floor of said building and to transfer heat to said working fluid flowing through said radiating panel, wherein said radiating panel further comprises a twin-wall polycarbonate sheet further comprising a plurality of fluid passages extending through said sheet, wherein a first plurality of said fluid passages are filled with a phase change material, and a second plurality of said fluid passages comprise fluid flow channels configured for carrying said working fluid;
   said solar thermal module defining a first working fluid flow path from said first manifold, through said absorber sheet, and out of said second manifold when said module is operated in a thermal collection operational mode, and defining a second working fluid flow path from said first manifold, through said glazing sheet, and out of said second manifold when said module is operated in a radiant cooling operational mode, wherein said module is configured to cause working fluid to exit said top portion of said second manifold when said module is operated in said radiant cooling operational mode.

2. The solar thermal system of claim 1, wherein said module is configured to cause working fluid to exit said bottom portion of said second manifold when said module is operated in said thermal collection operational mode.

3. The solar thermal system of claim 1, further comprising an insulation board positioned above said radiating panel.

4. The solar thermal system of claim 3, further comprising batt insulation positioned above said insulation board.

5. The solar thermal system of claim 1, wherein said radiating panel is attached to adjacent ceiling joints in said building.

6. The solar thermal system of claim 1, wherein said radiating panel is positioned within an attic of said building.

7. The solar thermal system of claim 6, wherein said radiating panel is positioned in contact with a horizontal wallboard in said building and is configured to absorb heat from said horizontal wallboard and to transfer heat to said working fluid flowing through said radiating panel.

8. The solar thermal collector system of claim 7, wherein said radiating panel further comprises a twin-wall polycarbonate sheet.

9. The solar thermal collector system of claim 8, said twin-wall polycarbonate sheet further comprising a plurality of fluid passages extending through said sheet.

10. The solar thermal collector system of claim 9, wherein a first plurality of said fluid passages are filled with a phase change material, and a second plurality of said fluid passages comprise fluid flow channels configured for carrying said working fluid.

11. A solar thermal system operable as a solar thermal collection system and a radiant cooling system, comprising:
at least one solar thermal module comprising:
a glazing sheet forming a top surface of said module;
an absorber sheet on an interior of said module and positioned below and spaced apart from said glazing sheet, said absorber sheet being configured to absorb heat from the sun and to transfer heat to a working fluid in said absorber sheet;
a first manifold connected to a first end of each of said glazing sheet and said absorber sheet; and
a second manifold connected to a second end of each of said glazing sheet and said absorber sheet; and
a thermal actuating valve positioned within said second manifold, wherein said thermal actuating valve fluidly separates a bottom portion of said second manifold from a top portion of said second manifold and controls flow between said bottom portion and said top portion;
wherein said module is installed externally on a roof of a building, said system further comprising a radiating panel in fluid communication with said module, wherein said radiating panel is positioned within an attic of said building and is positioned in contact with a horizontal wallboard in said building and is configured to absorb heat from said horizontal wallboard and to transfer heat to said working fluid flowing through said radiating panel, wherein said radiating panel further comprises a twin-wall polycarbonate sheet further comprising a plurality of fluid passages extending through said sheet, wherein a first plurality of said fluid passages are filled with a phase change material, and a second plurality of said fluid passages comprise fluid flow channels configured for carrying said working fluid;
said solar thermal module defining a first working fluid flow path from said first manifold, through said absorber sheet, and out of said second manifold when said module is operated in a thermal collection operational mode, and defining a second working fluid flow path from said first manifold, through said glazing sheet, and out of said second manifold when said module is operated in a radiant cooling operational mode, wherein said module is configured to cause working fluid to exit said top portion of said second manifold when said module is operated in said radiant cooling operational mode.

12. The solar thermal system of claim 11, further comprising an insulation board positioned above said radiating panel.

13. A solar thermal system operable as a solar thermal collection system and a radiant cooling system, comprising:
at least one solar thermal module comprising:
a glazing sheet forming a top surface of said module;
an absorber sheet on an interior of said module and positioned below and spaced apart from said glazing sheet, said absorber sheet being configured to absorb heat from the sun and to transfer heat to a working fluid in said absorber sheet;
a first manifold connected to a first end of each of said glazing sheet and said absorber sheet; and
a second manifold connected to a second end of each of said glazing sheet and said absorber sheet; and
a thermal actuating valve positioned within said second manifold;
said system further comprising a radiating panel in fluid communication with said module, said radiating panel further comprising a plurality of fluid passages extending through said panel, wherein a first plurality of said fluid passages are filled with a phase change material, and a second plurality of said fluid passages comprise fluid flow channels configured for carrying said working fluid;
said solar thermal module defining a first working fluid flow path from said first manifold, through said absorber sheet, and out of said second manifold when said module is operated in a thermal collection operational mode, and defining a second working fluid flow path from said first manifold, through said glazing sheet, and out of said second manifold when said module is operated in a radiant cooling operating mode.

14. The solar thermal system of claim 13, wherein said thermal actuating valve fluidly separates a bottom portion of said second manifold from a top portion of said second manifold and controls flow between said bottom portion and said top portion.

15. The solar thermal system of claim 14, wherein said module is configured to cause working fluid to exit said bottom portion of said second manifold when said module is operated in said thermal collection operational mode.

16. The solar thermal system of claim 14, wherein said module is configured to cause working fluid to exit said top portion of said second manifold when said module is operated in said radiant cooling operational mode.

17. The solar thermal system of claim 13, wherein said radiating panel is suspended from a ceiling on an interior of said building.

18. The solar thermal system of claim 17, wherein said radiating panel is positioned to absorb heat generated from a concrete slab floor of said building and to transfer heat to said working fluid flowing through said radiating panel.

19. The solar thermal collector system of claim 18, wherein said radiating panel further comprises a twin-wall polycarbonate sheet.

20. The solar thermal system of claim 17, further comprising an insulation board positioned above said radiating panel.

21. The solar thermal system of claim 20, further comprising batt insulation positioned above said insulation board.

22. The solar thermal system of claim 13, wherein said radiating panel is positioned within an attic of said building.

23. The solar thermal system of claim 22, wherein said radiating panel is positioned in contact with a horizontal wallboard in said building and is configured to absorb heat from said horizontal wallboard and to transfer heat to said working fluid flowing through said radiating panel.

* * * * *